(12) United States Patent
Chen et al.

(10) Patent No.: US 12,278,981 B2
(45) Date of Patent: *Apr. 15, 2025

(54) VIDEO CODING METHOD AND APPARATUS

(71) Applicant: HUAWEI TECHNOLOGIES CO., LTD., Guangdong (CN)

(72) Inventors: Xu Chen, Shenzhen (CN); Jicheng An, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,700

(22) Filed: Jul. 25, 2023

(65) Prior Publication Data
US 2023/0379490 A1 Nov. 23, 2023

Related U.S. Application Data

(63) Continuation of application No. 16/949,793, filed on Nov. 13, 2020, now Pat. No. 11,765,378, which is a
(Continued)

(51) Int. Cl.
*H04N 19/513* (2014.01)
*H04N 19/105* (2014.01)
*H04N 19/176* (2014.01)

(52) U.S. Cl.
CPC ......... *H04N 19/513* (2014.11); *H04N 19/105* (2014.11); *H04N 19/176* (2014.11)

(58) Field of Classification Search
CPC .. H04N 19/105; H04N 19/176; H04N 19/463; H04N 19/513; H04N 19/52;
(Continued)

(56) References Cited

U.S. PATENT DOCUMENTS 8,396,131 B2 3/2013 Rui
2007/0177673 A1 8/2007 Yang
(Continued)

FOREIGN PATENT DOCUMENTS

CN 102273206 A 12/2011
CN 102340663 A 2/2012
(Continued)

OTHER PUBLICATIONS

Gary J. Sullivan et al., "Overview of the High Efficiency Video Coding (HEVC) Standard", IEEE Transactions on Circuits and Systems for Video Technology, vol. 22, No. 12, Dec. 2012, total 20 pages.
(Continued)

*Primary Examiner* — Anner N Holder
(74) *Attorney, Agent, or Firm* — WOMBLE BOND DICKINSON (US) LLP

(57) ABSTRACT

Embodiments of this application disclose a method for obtaining a motion vector, including: determining a reference block of a to-be-processed block, wherein the reference block and the to-be-processed block have a preset spatial correlation, the reference block is obtained based on a prediction block of the reference block determined by a refined initial motion vector, the refined initial motion vector is obtained based on an initial motion vector and one or more preset motion vector offsets, and the initial motion vector is obtained based on a predicted motion vector of the reference block; and using the initial motion vector as a predicted motion vector of the to-be-processed block.

14 Claims, 21 Drawing Sheets

Related U.S. Application Data continuation of application No. PCT/CN2018/087180, filed on May 16, 2018.

(58) Field of Classification Search
CPC .... H04N 19/523; H04N 19/56; H04N 19/567; H04N 19/577
See application file for complete search history.

(56) References Cited

U.S. PATENT DOCUMENTS

| | | |
|---|---|---|
| 2010/0135399 A1 | 6/2010 | Rui |
| 2011/0170598 A1 | 7/2011 | Shi et al. |
| 2011/0293010 A1 | 12/2011 | Jeong et al. |
| 2013/0114717 A1 | 5/2013 | Zheng et al. |
| 2013/0315309 A1* | 11/2013 | Lin ................ H04N 19/523 375/240.14 |
| 2014/0286427 A1 | 9/2014 | Fukushima et al. |
| 2014/0286433 A1* | 9/2014 | He ................ H04N 19/53 375/240.16 |
| 2015/0055706 A1 | 2/2015 | Xu et al. |
| 2018/0041769 A1 | 2/2018 | Chuang et al. |
| 2018/0084260 A1 | 3/2018 | Chien et al. |
| 2018/0241998 A1* | 8/2018 | Chen ................ H04N 19/109 |
| 2018/0295385 A1 | 10/2018 | Alshin et al. |
| 2020/0084441 A1 | 3/2020 | Lee et al. |

FOREIGN PATENT DOCUMENTS

| | | |
|---|---|---|
| CN | 102883161 A | 1/2013 |
| CN | 103024378 A | 4/2013 |
| CN | 106507106 A | 3/2017 |
| CN | 107113442 A | 8/2017 |
| CN | 107623849 A | 1/2018 |
| CN | 107948654 A | 4/2018 |
| EP | 3162062 A1 | 5/2017 |
| EP | 3509304 A1 | 7/2019 |
| JP | 2017508346 A | 3/2017 |
| JP | 7407741 B2 | 1/2024 |
| RU | 2607261 C1 | 1/2017 |
| WO | 2014058796 A1 | 4/2014 |
| WO | 2015106126 A1 | 7/2015 |
| WO | 2015200413 A1 | 12/2015 |
| WO | 2018028559 A1 | 2/2018 |
| WO | 2018058622 A1 | 4/2018 |
| WO | 2018064524 A1 | 4/2018 |

OTHER PUBLICATIONS

JVET-G1001-v1, Jianle Chen et al, Algorithm Description of Joint Exploration Test Model 7 (JEM 7), oint Video Exploration Team (JVET) of ITU-T SG 16 WP 3 and ISO/IEC JTC 1/SC 29/WG 11, 7th Meeting: Torino, IT, 13 Jul. 21, 2017, Total 48 Pages.

\* cited by examiner

Original merge candidate predicted motion vector list

| Merge_idx | L0 | L1 |
|---|---|---|
| 0 | mvL0_A, ref0 | – |
| 1 | – | mvL1_B, ref0 |
| 2 | mvL0_A, ref0 | mvL1_B, ref0 |
| 3 | – | – |
| 4 | – | – |

Add a "0" motion vector

Candidate predicted motion vector list including the added "0" motion vector

| Merge_idx | L0 | L1 |
|---|---|---|
| 0 | mvL0_A, ref0 | – |
| 1 | – | mvL1_B, ref0 |
| 2 | mvL0_A, ref0 | mvL1_B, ref0 |
| 3 | (0, 0), ref0 | (0, 0), ref0 |
| 4 | (0, 0), ref1 | (0, 0), ref1 |

VIDEO CODING METHOD AND APPARATUS

CROSS-REFERENCE TO RELATED APPLICATIONS

This application is a continuation of U.S. patent application Ser. No. 16/949,793, filed on Nov. 13, 2020, which is a continuation of International Application No. PCT/CN2018/087180, filed on May 16, 2018, the disclosures of which are hereby incorporated by reference in their entirety.

TECHNICAL FIELD

This application relates to the field of video coding technologies, and in particular, to a video coding method and apparatus.

BACKGROUND

A digital video technology may be widely applied to various apparatuses, including a digital television, a digital live broadcast system, a wireless broadcast system, a personal digital assistant (PDA), a notebook computer, a tablet computer, an e-book reader, a digital camera, a digital recording apparatus, a digital media player, a video game apparatus, a video game console, a cellular or satellite radio telephone, a video conferencing apparatus, a video streaming transmission apparatus, and the like. A digital video apparatus implements video decoding technologies, for example, MPEG-2, MPEG-4, ITU-T H.263, ITU-T H.264/MPEG-4 Part 10 advanced video decoding (AVC), ITU-T H.265 (also referred to as high efficiency video decoding (HEVC)), and video decoding technologies described in extended parts of these standards. The digital video apparatus may send, receive, encode, decode, and/or store digital video information more efficiently by implementing these video decoding technologies.

In a video compression technology, inherent redundant information in a video sequence may be reduced or removed by performing spatial (intra) prediction and/or temporal (inter) prediction. For block-based video decoding, a video picture may be partitioned into video blocks. The video block may also be referred to as a tree block, an encoding unit/decoding unit (coding unit, CU), or an encoding node/decoding node. A video block in an intra-decoded (I) slice of a picture is encoded through spatial prediction for a reference sample in an adjacent block in the same picture. A video block in an inter-decoded (P or B) slice of a picture may be encoded through spatial prediction for a reference sample in an adjacent block in the same picture or temporal prediction for a reference sample in another reference picture. The picture may be referred to as a frame, and the reference picture may be referred to as a reference frame.

SUMMARY

Embodiments of this application provide a video coding method and a related device, and mainly relate to obtaining of a motion vector. In a conventional inter prediction technology and an intra prediction technology related to motion estimation, a motion vector is a key implementation element, and is used to determine a predictor of a to-be-processed block, to reconstruct the to-be-processed block. Generally, the motion vector is constituted by a predicted motion vector and a motion vector difference. The motion vector difference is a difference between the motion vector and the predicted motion vector. In some technologies, for example, in a motion vector merge mode (or merge mode), the motion vector difference is not used, and the predicted motion vector is directly considered as the motion vector. The predicted motion vector is usually obtained from a previous coding or decoding block that has a temporal or spatial correlation with the to-be-processed block, and the motion vector of the to-be-processed block is usually used as a predicted motion vector of a subsequent coding block or decoding block.

However, with the development of technologies, a technology related to motion vector update emerges. The motion vector for determining the predictor of the to-be-processed block is no longer directly taken from the predicted motion vector or a sum of the predicted motion vector and the motion vector difference (herein, the predicted motion vector or the sum of the predicted motion vector and the motion vector difference is referred to as an initial motion vector), but is taken from an refined value of the initial motion vector. Specifically, after the initial motion vector of the to-be-processed block is obtained, the initial motion vector is first refined to obtain an actual motion vector, and then a prediction block of the to-be-processed block is obtained by using the actual motion vector. The actual motion vector is stored for use in a prediction procedure of the subsequent coding block or decoding block. The motion vector update technology improves prediction precision and encoding efficiency. However, for the subsequent coding block or decoding block, a prediction step can be performed only after motion vector update is completed for one or more previous coding blocks or decoding blocks, in other words, after the actual motion vector is determined. This causes a delay to parallel processing or pipe-line processing of different blocks compared with a method in which no motion vector update is performed.

According to a first aspect of this application, a method for obtaining a motion vector is provided, and includes: determining a reference block of a to-be-processed block, where the reference block and the to-be-processed block have a preset temporal or spatial correlation, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets; and using the initial motion vector of the reference block as a predicted motion vector of the to-be-processed block.

In the foregoing manner, an initial motion vector before update is used to replace an actual motion vector and used for predicting a subsequent coding block or decoding block. A prediction step may be performed for the subsequent coding block or decoding block before update of the actual motion vector is completed. This ensures encoding efficiency improvement brought by motion vector update, and eliminates the processing delay.

In an embodiment, the initial motion vector of the reference block is obtained in the following manner: using the predicted motion vector of the reference block as the initial motion vector of the reference block; or adding the predicted motion vector of the reference block and a motion vector difference of the reference block to obtain the initial motion vector of the reference block.

In different inter prediction modes, an initial motion vector may be taken from a predicted motion vector or a sum of a predicted motion vector and a motion vector difference. This improves encoding efficiency.

In an embodiment, the prediction block of the reference block is obtained in the following manner: obtaining, from a reference frame of the reference block, a picture block indicated by the initial motion vector of the reference block, and using the obtained picture block as a temporary prediction block of the reference block; adding the initial motion vector and the one or more preset motion vector offsets of the reference block to obtain one or more actual motion vectors, where each actual motion vector indicates a search position; obtaining one or more candidate prediction blocks at search positions indicated by the one or more actual motion vectors, where each search position corresponds to one candidate prediction block; and selecting, from the one or more candidate prediction blocks, a candidate prediction block with a minimum pixel difference from the temporary prediction block as the prediction block of the reference block.

In this embodiment, a motion vector update manner is described. Based on motion vector update, prediction is more accurate, and encoding efficiency is improved.

In an embodiment, the method is used for bidirectional prediction, the reference frame includes a first-direction reference frame and a second-direction reference frame, the initial motion vector includes a first-direction initial motion vector and a second-direction initial motion vector, and the obtaining, from a reference frame of the reference block, a picture block indicated by the initial motion vector of the reference block, and using the obtained picture block as a temporary prediction block of the reference block includes: obtaining, from the first-direction reference frame of the reference block, a first picture block indicated by the first-direction initial motion vector of the reference block; obtaining, from the second-direction reference frame of the reference block, a second picture block indicated by the second-direction initial motion vector of the reference block; and weighting the first picture block and the second picture block to obtain the temporary prediction block of the reference block.

In this embodiment, a motion vector update manner during bidirectional prediction is described. Based on motion vector update, prediction is more accurate, and encoding efficiency is improved.

In an embodiment, the method further includes: when a motion vector resolution of the actual motion vector is higher than preset pixel precision, rounding the motion vector resolution of the actual motion vector, so that a motion vector resolution of a processed actual motion vector equals the preset pixel precision.

This embodiment ensures that the motion vector resolution of the actual motion vector equals the preset pixel precision, and reduces calculation complexity caused by different motion vector resolutions. It should be understood that, when a method in which an initial motion vector before update is used to replace an actual motion vector and used for predicting a subsequent coding block or decoding block is not used, this embodiment can also reduce a delay when this embodiment is separately used, because complexity of motion vector update is reduced.

In an embodiment, the selecting, from the one or more candidate prediction blocks, a candidate prediction block with a minimum pixel difference from the temporary prediction block as the prediction block of the reference block includes: selecting, from the one or more candidate prediction blocks, an actual motion vector corresponding to the candidate prediction block with the minimum pixel difference from the temporary prediction block; when a motion vector resolution of the selected actual motion vector is higher than preset pixel precision, rounding the motion vector resolution of the selected actual motion vector, so that a motion vector resolution of a processed selected actual motion vector equals the preset pixel precision; and determining that a prediction block corresponding to a position indicated by the processed selected actual motion vector is the prediction block of the reference block.

This embodiment also ensures that the motion vector resolution of the actual motion vector equals the preset pixel precision, and reduces calculation complexity caused by different motion vector resolutions. It should be understood that, when a method in which an initial motion vector before update is used to replace an actual motion vector and used for predicting a subsequent coding block or decoding block is not used, this embodiment can also reduce a delay when this embodiment is separately used, because complexity of motion vector update is reduced.

In an embodiment, the preset pixel precision is integer pixel precision, ½ pixel precision, ¼ pixel precision, or ⅛ pixel precision.

In an embodiment, the method further includes: using the predicted motion vector of the to-be-processed block as an initial motion vector of the to-be-processed block.

In an embodiment, the method further includes: adding the predicted motion vector of the to-be-processed block and a motion vector difference of the to-be-processed block to obtain an initial motion vector of the to-be-processed block.

In an embodiment, the method is used for video decoding, and the motion vector difference of the to-be-processed block is obtained by parsing first identification information in a bitstream.

In different inter prediction modes, an initial motion vector may be taken from a predicted motion vector or a sum of a predicted motion vector and a motion vector difference. This improves encoding efficiency.

In an embodiment, the method is used for video decoding, and the determining a reference block of a to-be-processed block includes: parsing a bitstream to obtain second identification information; and determining the reference block of the to-be-processed block based on the second identification information.

In an embodiment, the method is used for video encoding, and the determining a reference block of a to-be-processed block includes: selecting, from one or more candidate reference blocks of the to-be-processed block, a candidate reference block with a minimum rate-distortion cost as the reference block of the to-be-processed block.

A reference block is a video picture block that has a spatial or temporal correlation with a to-be-processed block, for example, may be a spatially adjacent block or a temporally co-located block. A motion vector of the reference block is used to predict a motion vector of the to-be-processed block. This improves encoding efficiency of the motion vector.

According to a second aspect of this application, an apparatus for obtaining a motion vector is provided, and includes: a determining module, configured to determine a reference block of a to-be-processed block, where the reference block and the to-be-processed block have a preset temporal or spatial correlation, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets; and an obtaining module, configured to use the initial motion vector of the reference block as a predicted motion vector of the to-be-processed block.

In an embodiment, the obtaining module is further configured to: use the predicted motion vector of the reference block as the initial motion vector of the reference block; or add the predicted motion vector of the reference block and a motion vector difference of the reference block to obtain the initial motion vector of the reference block.

In an embodiment, the obtaining module is further configured to: obtain, from a reference frame of the reference block, a picture block indicated by the initial motion vector of the reference block, and use the obtained picture block as a temporary prediction block of the reference block; add the initial motion vector and the one or more preset motion vector offsets of the reference block to obtain one or more actual motion vectors, where each actual motion vector indicates a search position; obtain one or more candidate prediction blocks at search positions indicated by the one or more actual motion vectors, where each search position corresponds to one candidate prediction block; and select, from the one or more candidate prediction blocks, a candidate prediction block with a minimum pixel difference from the temporary prediction block as the prediction block of the reference block.

In an embodiment, the apparatus is configured for bidirectional prediction, the reference frame includes a first-direction reference frame and a second-direction reference frame, the initial motion vector includes a first-direction initial motion vector and a second-direction initial motion vector, and the obtaining module is configured to: obtain, from the first-direction reference frame of the reference block, a first picture block indicated by the first-direction initial motion vector of the reference block; obtain, from the second-direction reference frame of the reference block, a second picture block indicated by the second-direction initial motion vector of the reference block; and weight the first picture block and the second picture block to obtain the temporary prediction block of the reference block.

In an embodiment, the apparatus further includes: a rounding module, configured to: when a motion vector resolution of the actual motion vector is higher than preset pixel precision, round the motion vector resolution of the actual motion vector, so that a motion vector resolution of a processed actual motion vector equals the preset pixel precision.

In an embodiment, the obtaining module is configured to: select, from the one or more candidate prediction blocks, an actual motion vector corresponding to the candidate prediction block with the minimum pixel difference from the temporary prediction block; when a motion vector resolution of the selected actual motion vector is higher than preset pixel precision, round the motion vector resolution of the selected actual motion vector, so that a motion vector resolution of a processed selected actual motion vector equals the preset pixel precision; and determine that a prediction block corresponding to a position indicated by the processed selected actual motion vector is the prediction block of the reference block.

In an embodiment, the preset pixel precision is integer pixel precision, ½ pixel precision, ¼ pixel precision, or ⅛ pixel precision.

In an embodiment, the obtaining module is configured to use the predicted motion vector of the to-be-processed block as an initial motion vector of the to-be-processed block.

In an embodiment, the obtaining module is configured to add the predicted motion vector of the to-be-processed block and a motion vector difference of the to-be-processed block to obtain an initial motion vector of the to-be-processed block.

In an embodiment, the apparatus is used for video decoding, and the motion vector difference of the to-be-processed block is obtained by parsing first identification information in a bitstream.

In an embodiment, the apparatus is used for video decoding, and the determining module is configured to: parse a bitstream to obtain second identification information; and determine the reference block of the to-be-processed block based on the second identification information.

In an embodiment, the apparatus is used for video encoding, and the determining module is configured to: select, from one or more candidate reference blocks of the to-be-processed block, a candidate reference block with a minimum rate-distortion cost as the reference block of the to-be-processed block.

According to a third aspect of this application, a method for obtaining a motion vector is provided, and includes: determining a reference block of a to-be-processed block, where the reference block and the to-be-processed block have a preset temporal or spatial correlation; obtaining an initial motion vector of the to-be-processed block based on the reference block; obtaining a prediction block of the to-be-processed block based on the initial motion vector and one or more preset motion vector offsets of the to-be-processed block; and using the initial motion vector of the to-be-processed block as a predicted motion vector of a subsequent to-be-processed block that is processed after the to-be-processed block.

In an embodiment, the obtaining an initial motion vector of the to-be-processed block based on the reference block includes: using an initial motion vector of the reference block as the initial motion vector of the to-be-processed block; or adding an initial motion vector of the reference block and a motion vector difference of the to-be-processed block to obtain the initial motion vector of the to-be-processed block.

In an embodiment, the obtaining a prediction block of the to-be-processed block based on the initial motion vector and one or more preset motion vector offsets of the to-be-processed block includes: obtaining, from a reference frame of the to-be-processed block, a picture block indicated by the initial motion vector of the to-be-processed block, and using the obtained picture block as a temporary prediction block of the to-be-processed block; adding the initial motion vector and the one or more preset motion vector offsets of the to-be-processed block to obtain one or more actual motion vectors, where each actual motion vector indicates a search position; obtaining one or more candidate prediction blocks at search positions indicated by the one or more actual motion vectors, where each search position corresponds to one candidate prediction block; and selecting, from the one or more candidate prediction blocks, a candidate prediction block with a minimum pixel difference from the temporary prediction block as the prediction block of the to-be-processed block.

In an embodiment, the method is used for bidirectional prediction, the reference frame includes a first-direction reference frame and a second-direction reference frame, the initial motion vector of the to-be-processed block includes a first-direction initial motion vector and a second-direction initial motion vector, and the obtaining, from a reference frame of the to-be-processed block, a picture block indicated by the initial motion vector of the to-be-processed block, and using the obtained picture block as a temporary prediction block of the to-be-processed block includes: obtaining, from the first-direction reference frame of the to-be-processed block, a first picture block indicated by the first-direction initial motion vector of the to-be-processed block; obtaining, from the second-direction reference frame of the to-be-processed block, a second picture block indicated by the second-direction initial motion vector of the to-be-processed block; and weighting the first picture block and the second picture block to obtain the temporary prediction block of the to-be-processed block.

In an embodiment, the method further includes: when a motion vector resolution of the actual motion vector is higher than preset pixel precision, rounding the motion vector resolution of the actual motion vector, so that a motion vector resolution of a processed actual motion vector equals the preset pixel precision.

In an embodiment, the selecting, from the one or more candidate prediction blocks, a candidate prediction block with a minimum pixel difference from the temporary prediction block as the prediction block of the to-be-processed block includes: selecting, from the one or more candidate prediction blocks, an actual motion vector corresponding to the candidate prediction block with the minimum pixel difference from the temporary prediction block; when a motion vector resolution of the selected actual motion vector is higher than preset pixel precision, rounding the motion vector resolution of the selected actual motion vector, so that a motion vector resolution of a processed selected actual motion vector equals the preset pixel precision; and determining that a prediction block corresponding to a position indicated by the processed selected actual motion vector is the prediction block of the to-be-processed block.

In an embodiment, the preset pixel precision is integer pixel precision, ½ pixel precision, ¼ pixel precision, or ⅛ pixel precision.

In an embodiment, the method further includes: using the predicted motion vector of the subsequent to-be-processed block that is processed after the to-be-processed block, as an initial motion vector of the subsequent to-be-processed block that is processed after the to-be-processed block.

In an embodiment, the method further includes: adding the predicted motion vector and the motion vector of the subsequent to-be-processed block that is processed after the to-be-processed block, to obtain an initial motion vector of the subsequent to-be-processed block that is processed after the to-be-processed block.

In an embodiment, the method is used for video decoding, and the motion vector difference of the subsequent to-be-processed block that is processed after the to-be-processed block is obtained by parsing first identification information in a bitstream.

In an embodiment, the method is used for video decoding, and the determining a reference block of a to-be-processed block includes: parsing a bitstream to obtain second identification information; and determining the reference block of the to-be-processed block based on the second identification information.

In an embodiment, the method is used for video encoding, and the determining a reference block of a to-be-processed block includes: selecting, from one or more candidate reference blocks of the to-be-processed block, a candidate reference block with a minimum rate-distortion cost as the reference block of the to-be-processed block.

According to a fourth aspect of this application, a device for obtaining a motion vector is provided. The device may be applied to an encoder side or a decoder side. The device includes a processor and a memory. The processor and the memory are connected to each other (for example, connected to each other through a bus). In an embodiment, the device may further include a transceiver. The transceiver is connected to the processor and the memory, and is configured to receive/send data. The memory is configured to store program code and video data. The processor is configured to read the program code stored in the memory, to perform the method described in the first aspect or the third aspect.

According to a fifth aspect of this application, a video coding system is provided. The video coding system includes a source apparatus and a destination apparatus. The source apparatus and the destination apparatus may be communicatively connected. The source apparatus generates encoded video data. Therefore, the source apparatus may be referred to as a video encoding apparatus or a video encoding device. The destination apparatus may decode the encoded video data generated by the source apparatus. Therefore, the destination apparatus may be referred to as a video decoding apparatus or a video decoding device. The source apparatus and the destination apparatus may be examples of a video coding apparatus or a video coding device. The method described in the first aspect or the third aspect is applied to the video coding apparatus or the video coding device.

According to a sixth aspect of this application, a computer-readable storage medium is provided. The computer-readable storage medium stores instructions. When the instructions are run on a computer, the computer is enabled to perform the method described in the first aspect or the third aspect.

According to a seventh aspect of this application, a computer program product including an instruction is provided. When the computer program product runs on a computer, the computer is enabled to perform the method described in the first aspect or the third aspect.

It should be understood that embodiments corresponding to the second to the seventh aspects of this application and an embodiment corresponding to the first aspect of this application have same invention objectives, similar technical features, and same beneficial technical effects. Details are not described again.

DESCRIPTION OF EMBODIMENTS

The following clearly describes the technical solutions in the embodiments of this application with reference to the accompanying drawings in the embodiments of this application.

Figure 1:
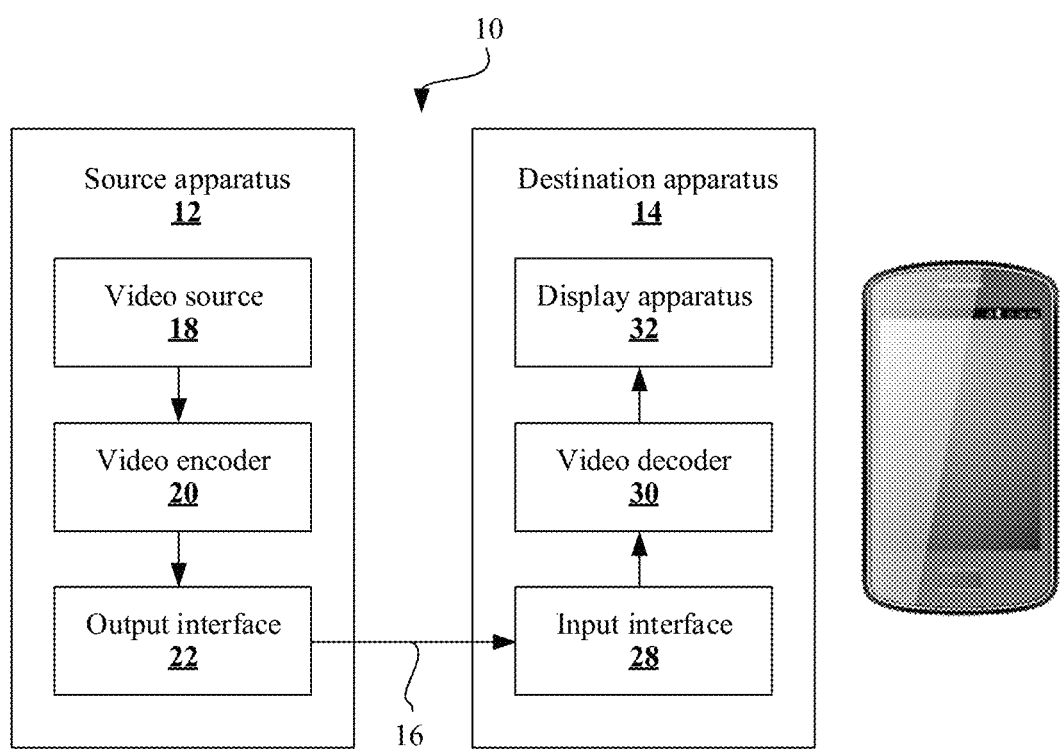
FIG. 1 is a block diagram of an example of a video coding system according to an embodiment.

FIG. 1 is a schematic block diagram of a video coding system according to an embodiment. As shown in FIG. 1, system 10 includes a source apparatus 12. The source apparatus 12 generates encoded video data that is to be subsequently decoded by a destination apparatus 14. The source apparatus 12 and the destination apparatus 14 may include any one of a wide range of apparatuses, including a desktop computer, a notebook computer, a tablet computer, a set top box, a telephone handset such as a "smart" phone, a "smart" touchpad, a television, a camera, a display apparatus, a digital media player, a video game console, a video streaming transmission apparatus, or the like. In some embodiments, the source apparatus 12 and the destination apparatus 14 may be equipped for wireless communication.

The destination apparatus 14 may receive to-be-decoded encoded video data over a link 16. The link 16 may include any type of medium or apparatus that can transfer the encoded video data from the source apparatus 12 to the destination apparatus 14. In an embodiment, the link 16 may include a communications medium that enables the source apparatus 12 to directly transmit the encoded video data to the destination apparatus 14 in real time. The encoded video data may be modulated according to a communications standard (for example, a wireless communications protocol) and then is transmitted to the destination apparatus 14. The communications medium may include any wireless or wired communications medium, for example, a radio frequency spectrum or one or more physical transmission lines. The communications medium may constitute a part of a packet-based network (for example, a local area network, a wide area network, or a global network such as the internet). The communications medium may include a router, a switch, a base station, or any other devices that may be used to facilitate communication from the source apparatus 12 to the destination apparatus 14.

Alternatively, the encoded data may be output to a storage apparatus 24 through an output interface 22. Similarly, the encoded data may be accessed from the storage apparatus 24 through an input interface. The storage apparatus 24 may include any one of a number of scattered or local data storage media, for example, a hard disk drive, a Blu-ray disc, a DVD, a CD-ROM, a flash memory, a volatile or non-volatile memory, or any other appropriate digital storage media configured to store the encoded video data. In another embodiment, the storage apparatus 24 may correspond to a file server or another intermediate storage apparatus capable of keeping an encoded video generated by the source apparatus 12. The destination apparatus 14 may access stored video data from the storage apparatus 24 through streaming transmission or downloading. The file server may be any type of server that can store the encoded video data and transmit the encoded video data to the destination apparatus 14. In an embodiment, the file server includes a website server, a file transfer protocol server, a network-attached storage apparatus, or a local disk drive. The destination apparatus 14 may access the encoded video data through any standard data connection including an internet connection. The data connection may include a wireless channel (for example, a Wi-Fi connection) or a wired connection (for example, a cable modem) that is suitable for accessing the encoded video data stored in the file server, or a combination thereof. The encoded video data may be transmitted from the storage apparatus 24 in a streaming manner, through downloading, or a combination thereof.

The technologies in this application are not necessarily limited to wireless applications or settings. The technologies can be applied to video decoding, to support any one of a number of multimedia applications, for example, over-the-air television broadcasting, cable television transmission, satellite television transmission, video streaming transmission (for example, through the internet), encoding of a digital video for storage in a data storage medium, decoding of a digital video stored in a data storage medium, or another application. In some embodiments, the system 10 may be configured to support unidirectional or bidirectional video transmission, to support applications such as video streaming transmission, video playing, video broadcasting, and/or videotelephony.

In an embodiment, the source apparatus 12 includes a video source 18, a video encoder 20, and the output interface 22. In some embodiments, the output interface 22 may include a modulator/demodulator (e.g., a modem) and/or a transmitter. In the source apparatus 12, the video source 18 may include, for example, the following sources: a video capture apparatus (for example, a video camera), a video archive including a previously captured video, a video feed-in interface for receiving a video from a video content provider, and/or a computer graphics system for generating computer graphics data as a source video, or a combination thereof. In an embodiment, if the video source 18 is the video camera, the source apparatus 12 and the destination apparatus 14 can constitute a camera phone or a video phone. For example, the technologies described in this application may be applicable to video decoding, and may be applicable to wireless and/or wired applications.

The video encoder 20 may encode a captured or pre-captured video or a video generated by a computer. The encoded video data may be directly transmitted to the destination apparatus 14 through the output interface 22 of the source apparatus 12. The encoded video data may also (or alternatively) be stored into the storage apparatus 24, so that the destination apparatus 14 or another apparatus subsequently accesses the encoded video data for decoding and/or playing.

The destination apparatus 14 includes an input interface 28, a video decoder 30, and a display apparatus 32. In some embodiments, the input interface 28 may include a receiver and/or a modem. The input interface 28 of the destination apparatus 14 receives the encoded video data over the link 16. The encoded video data transmitted or provided to the storage apparatus 24 over the link 16 may include a number of syntax elements that are generated by the video encoder 20 and used by a video decoder 30 to decode the video data. These syntax elements may be included in the encoded video data that is transmitted on the communications medium, and that is stored in the storage medium or stored in the file server.

The display apparatus 32 may be integrated with the destination apparatus 14 or disposed outside the destination apparatus 14. In some embodiments, the destination apparatus 14 may include an integrated display apparatus and also be configured to connect to an interface of an external display apparatus. In other embodiments, the destination apparatus 14 may be a display apparatus. Generally, the display apparatus 32 displays decoded video data to a user, and may include any one of a number of display apparatuses, for example, a liquid crystal display, a plasma display, an organic light-emitting diode display, or a display apparatus of another type.

The video encoder 20 and the video decoder 30 may operate according to, for example, a next-generation video coding compression standard (H.266) that is currently being developed, and may comply with an H.266 test model (JEM). Alternatively, the video encoder 20 and the video decoder 30 may operate according to, for example, other dedicated or industrial standards such as the ITU-T H.265 standard or the ITU-T H.264 standard, or extensions of these standards. The ITU-T H.265 standard is also referred to as a high efficiency video coding standard, and the ITU-T H.264 standard is alternatively referred to as MPEG-4 Part 10, or advanced video coding (AVC). However, the technologies in this application are not limited to any particular coding standard. In other embodiments, video compression standards include MPEG-2 and ITU-T H.263.

Although not shown in FIG. 1, in some embodiments, the video encoder 20 and the video decoder 30 may be respectively integrated with an audio encoder and an audio decoder, and may include an appropriate multiplexer-demultiplexer (MUX-DEMUX) unit or other hardware and software, to encode both an audio and a video in a same data stream or separate data streams. In some embodiments, the MUX-DEMUX unit may comply with the ITU H.223 multiplexer protocol or other protocols such as the user datagram protocol (UDP).

The video encoder 20 and the video decoder 30 each may be implemented as any one of a number of appropriate encoder circuits, for example, one or more microprocessors, digital signal processors (DSP), application-specific integrated circuits (ASIC), field-programmable gate arrays (FPGA), discrete logic, software, hardware, firmware, or any combination thereof. When the technologies are implemented partially in software, an apparatus may store an instruction for the software into an appropriate non-transitory computer-readable medium, and may execute the instruction in hardware by using one or more processors, to execute the technologies in this application. Each of the video encoder 20 and the video decoder 30 may be included in one or more encoders or decoders. Either of the video encoder 20 and the video decoder 30 may be integrated as a part of a combined encoder/decoder (CODEC) in a corresponding apparatus.

This application may, for example, relate to another apparatus in which the video encoder 20 signals specific information to, for example, the video decoder 30. However, it should be understood that the video encoder 20 may associate specific syntax elements with encoded parts of the video data, to signal information. That is, the video encoder 20 may store the specific syntax elements into header information of the encoded parts of the video data, to signal the data. In some embodiments, these syntax elements may be encoded and stored (for example, stored into a storage system 34 or a file server 36) before being received and decoded by the video decoder 30. Therefore, the term "signal" may mean, for example, transmission of a syntax or transmission of other data used for decoding compressed video data, regardless of whether the transmission is performed in real time, nearly in real time, or within a time span. For example, the transmission may be performed when a syntax element is stored into a medium during encoding, and then the syntax element may be researched by a decoding apparatus at any time after being stored into the medium.

The JCT-VC has developed the H.265 (HEVC) standard. HEVC standardization is based on an evolved model of a video decoding apparatus, where the model is referred to as an HEVC test model (HM). A latest H.265 standard document is available at http://www.itu.int/rec/T-REC-H.265. A latest version of the standard document is H.265 (12/16), and the standard document is incorporated herein by reference in its entirety. In the HM, it is assumed that the video decoding apparatus has several additional capabilities relative to an existing algorithm of ITU-TH.264/AVC. For example, H.264 provides nine intra prediction coding modes, whereas the HM can provide up to 35 intra prediction coding modes.

The JVET is committed to developing the H.266 standard. An H.266 standardization process is based on an evolved model of the video decoding apparatus, where the model is referred to as the H.266 test model. H.266 algorithm descriptions are available at http://phenix.int-evry.fr/jvet, and latest algorithm descriptions are included in JVET-G1001-v1. The algorithm description document is incorporated herein by reference in its entirety. In addition, reference software for the JEM test model is available at https://jvet.hhi.fraunhofer.de/svn/svn_HMJEMSoftware/, and is also incorporated herein by reference in its entirety.

Generally, as described in an HM working model, a video frame or picture may be split into a sequence of tree blocks or largest coding units (LCUs) including both luminance and chrominance samples. The LCU is also referred to as a CTU. A tree block has a function similar to that of a macroblock in the H.264 standard. A slice includes several consecutive tree blocks in a decoding order. The video frame or picture may be partitioned into one or more slices. Each tree block can be partitioned into coding units based on a quadtree. For example, a tree block serving as a root node of the quadtree may be split into four child nodes, and each child node may also serve as a parent node and be split into four other child nodes. A final non-splittable child node serving as a leaf node of the quadtree includes a decoding node, for example, a decoded video block. In syntactic data associated with a decoded bitstream, a maximum quantity of times that the tree block can be split and a minimum size of the decoding node may be defined.

A coding unit includes a decoding node, a prediction unit (PU), and a transform unit (TU) associated with the decoding node. A size of the CU corresponds to a size of the decoding node, and a shape of the CU needs to be square. The size of the CU may range from 8×8 pixels to a maximum of 64×64 pixels or a larger tree block size. Each CU may include one or more PUs and one or more TUs. For example, syntactic data associated with the CU may describe partitioning of one CU into one or more PUs. Partitioning patterns may vary when the CU is encoded in a skip or direct mode, encoded in an intra prediction mode, or encoded in an inter prediction mode. The PU obtained through partitioning may be in a non-square shape. For example, the syntactic data associated with the CU may also describe partitioning of one CU into one or more TUs based on the quadtree. The TU may be in a square or non-square shape.

The HEVC standard allows TU-based transform, and TUs may be different for different CUs. A size of a TU is usually set based on a size of a PU within a given CU defined for a partitioned LCU. However, a case may not always be like this. The size of the TU is generally the same as or less than the size of the PU. In some embodiments, a quadtree structure referred to as a residual quadtree (RQT) may be used to split a residual sample corresponding to the CU into smaller units. A leaf node of the RQT may be referred to as a TU. A pixel difference associated with the TU may be transformed to generate a transform coefficient, and the transform coefficient may be quantized.

Generally, the PU includes data related to a prediction process. For example, when the PU is encoded in the intra prediction mode, the PU may include data describing the intra prediction mode of the PU. In another embodiment, when the PU is encoded in the inter prediction mode, the PU may include data defining a motion vector for the PU. For example, the data defining the motion vector for the PU may describe a horizontal component of the motion vector, a vertical component of the motion vector, a resolution (for example, ¼ pixel precision or ⅛ pixel precision) of the motion vector, a reference picture to which the motion vector points, and/or a reference picture list (for example, a list 0, a list 1, or a list C) of the motion vector.

Generally, transform and quantization processes are used for the TU. A given CU including one or more PUs may also include one or more TUs. After prediction, the video encoder 20 may calculate a residual value corresponding to the PU. The residual value includes a pixel difference. The pixel difference may be transformed into a transform coefficient, and the transform coefficient is quantized and undergoes TU scanning to generate a serialized transform coefficient for entropy decoding. Herein, the term "video block" is usually used to indicate a decoding node of a CU. In some embodiments, the term "video block" may also be used to indicate a tree block including a decoding node, a PU, and a TU, for example, the tree block is an LCU or a CU.

A video sequence usually includes a series of video frames or pictures. For example, a group of pictures (GOP) includes a series of video pictures, or one or more video pictures. The GOP may include syntactic data in header information of the GOP, in header information of one or more of the pictures, or elsewhere, and the syntactic data describes a quantity of pictures included in the GOP. Each slice of a picture may include slice syntactic data describing a coding mode of the corresponding picture. The video encoder 20 usually performs an operation on video blocks in some video slices, to encode the video data. The video block may correspond to the decoding node in the CU. A size of the video block may be fixed or changeable, and may vary with a specified decoding standard.

In an embodiment, the HM supports prediction for a variety of PU sizes. Assuming that a size of a given CU is 2N×2N, the HM supports intra prediction for a PU size of 2N×2N or N×N, and inter prediction for a symmetric PU size of 2N×2N, 2N×N, N×2N, or N×N. The HM also supports asymmetric partitioning for inter prediction for PU sizes of 2N×nU, 2N×nD, nL×2N, and nR×2N. In asymmetric partitioning, the CU is not partitioned in one direction, and is partitioned into two parts in the other direction, where one part accounts for 25% of the CU and the other part accounts for 75% of the CU. The part accounting for 25% of the CU is indicated by an indicator including "n" followed by "U (Up)", "D (Down)", "L (Left)" or "R (Right)". Therefore, for example, "2N×nU" refers to a horizontally partitioned 2N×2N CU, with a 2N×0.5N PU at the top and a 2N×1.5N PU at the bottom.

Herein, "N×M" and "N multiplied by M" may be used interchangeably to indicate a pixel size of a video block in a vertical dimension and a horizontal dimension, for example, 16×16 pixels or 16 multiplied by 16 pixels. Generally, a 16×16 block has 16 pixels in a vertical direction (y=16) and has 16 pixels in a horizontal direction (x=16). Similarly, an N×N block has N pixels in the vertical direction and has N pixels in the horizontal direction, where N is a non-negative integer. Pixels in a block may be arranged in rows and columns. In addition, in a block, a quantity of pixels in the horizontal direction and a quantity of pixels in the vertical direction may be not necessarily the same. For example, a block may include N×M pixels, where M is not necessarily equal to N.

After performing intra or inter prediction decoding on the PU in the CU, the video encoder 20 may calculate residual data of the TU in the CU. The PU may include pixel data in a spatial domain (also referred to as a pixel domain). The TU may include a coefficient in a transform domain after transform (for example, discrete cosine transform (DCT), integer transform, wavelet transform, or conceptually similar transform) is performed on residual video data. The residual data may correspond to a pixel difference between pixels of an unencoded picture and a predictor corresponding to the PU. The video encoder 20 may generate a TU including residual data of the CU, and then transform the TU to generate a transform coefficient of the CU.

After performing any transform to generate transform coefficients, the video encoder 20 may quantize the transform coefficients. Quantization refers to, for example, a process of quantizing the coefficients, to reduce an amount of data used for representing the coefficients and implement further compression. The quantization process can reduce a bit depth associated with some or all of the coefficients. For example, during quantization, an n-bit value may be reduced to an m-bit value through rounding, where n is greater than m.

The JEM model further improves a video picture coding structure. Specifically, a block coding structure referred to as a quadtree plus binary tree (QTBT) structure is introduced. Without using such concepts as CU, PU, and TU in HEVC, the QTBT structure supports more flexible partitioned CU shapes. One CU may be in a square or rectangular shape. Quadtree partitioning is first performed on a CTU, and binary tree partitioning is further performed on a leaf node of the quadtree. In addition, there are two partitioning patterns in binary tree partitioning: symmetric horizontal partitioning and symmetric vertical partitioning. A leaf node of a binary tree is referred to as a CU. The CU in the JEM model cannot be further partitioned during prediction and transform. In other words, the CU, the PU, and the TU in the JEM model have a same block size. In the existing JEM model, a maximum CTU size is 256×256 luminance pixels.

In some embodiments, the video encoder 20 may scan the quantized transform coefficient in a predefined scanning order to generate a serialized vector that can be entropy coded. In other embodiments, the video encoder 20 may perform adaptive scanning. After scanning the quantized transform coefficient to form a one-dimensional vector, the video encoder 20 may perform entropy decoding on the one-dimensional vector by using context-based adaptive variable length coding (CAVLC), context-based adaptive binary arithmetic decoding (CABAC), syntax-based context-adaptive binary arithmetic decoding (SBAC), probability interval partitioning entropy (PIPE) decoding, or another entropy decoding method. The video encoder 20 may further perform entropy coding on the syntax element associated with the encoded video data, for the video decoder 30 to decode the video data.

To perform CABAC, the video encoder 20 may assign a context in a context model to a to-be-transmitted symbol. The context may be related to whether an adjacent value of the symbol is non-zero. To perform CAVLC, the video encoder 20 may select a variable-length code of the to-be-transmitted symbol. A codeword in variable-length coding (VLC) may be constructed, so that a shorter code corresponds to a more probable symbol and a longer code corresponds to a less probable symbol. In this way, compared with using equal-length codewords for all to-be-transmitted symbols, using VLC can reduce a bit rate. A probability in CABAC can be determined based on the context assigned to the symbol.

In this embodiment, the video encoder may perform inter prediction to reduce temporal redundancy between pictures. As described above, a CU may have one or more prediction units PUs depending on different video compression coding standards. In other words, a number of PUs may belong to a CU, or a PU and a CU have a same size. In an embodiment, when the CU and the PU have the same size, a partitioning pattern of the CU is no partition, or the CU is partitioned into one PU, and the PU is uniformly used for description. When the video encoder performs inter prediction, the video encoder may signal motion information for the PU to the video decoder. For example, the motion information for the PU may include a reference picture index, a motion vector, and a prediction direction identifier. The motion vector may indicate a displacement between a picture block (also referred to as a video block, a pixel block, a pixel set, or the like) of the PU and a reference block of the PU. The reference block of the PU may be a part of a reference picture similar to the picture block of the PU. The reference block may be located in a reference picture indicated by the reference picture index and the prediction direction identifier.

To reduce a quantity of coded bits required to represent the motion information for the PU, the video encoder may generate a candidate predicted motion vector (MV) list for each PU according to a merge prediction mode or an advanced motion vector prediction mode. Each candidate predicted motion vector in the candidate predicted motion vector list for the PU may indicate motion information. Motion information indicated by some candidate predicted motion vectors in the candidate predicted motion vector list may be based on motion information for other PUs. If a candidate predicted motion vector indicates motion information of one of a specified spatial candidate predicted motion vector position or a specified temporal candidate predicted motion vector position, the candidate predicted motion vector may be referred to as an original candidate predicted motion vector in this application. For example, in a merge mode, also referred to as the merge prediction mode, there may be five original spatial candidate predicted motion vector positions and one original temporal candidate predicted motion vector position. In some embodiments, the video encoder may generate an additional candidate predicted motion vector by combining some motion vectors from different original candidate predicted motion vectors, modifying the original candidate predicted motion vector, or inserting only a zero motion vector as the candidate predicted motion vector. The additional candidate predicted motion vector is not considered as the original candidate predicted motion vector and may be referred to as an artificially generated candidate predicted motion vector.

The technologies described herein usually include a technology for generating a candidate predicted motion vector list on the video encoder and a technology for generating the same candidate predicted motion vector list on the video decoder. The video encoder and the video decoder may generate the same candidate predicted motion vector list by implementing a same technology for constructing the candidate predicted motion vector list. For example, the video encoder and the video decoder may construct lists with a same quantity of candidate predicted motion vectors (for example, five candidate predicted motion vectors). The video encoder and the video decoder may first consider spatial candidate predicted motion vectors (for example, adjacent blocks in a same picture) and then consider temporal candidate predicted motion vectors (for example, candidate predicted motion vectors in different pictures), and finally may consider artificially generated candidate predicted motion vectors, until a required quantity of candidate predicted motion vectors are added to the lists. According to the technologies described herein, during construction of the candidate predicted motion vector list, a pruning operation may be performed for some types of candidate predicted motion vectors to remove repeated candidate predicted motion vectors from the candidate predicted motion vector list, and may not be performed for other types of candidate predicted motion vectors to reduce decoder complexity. For example, for a set of spatial candidate predicted motion vectors and for a temporal candidate predicted motion vector, the pruning operation may be performed to remove a candidate predicted motion vector with repeated motion information from the candidate predicted motion vector list. However, the artificially generated candidate predicted motion vector may be added to the candidate predicted motion vector list without being pruned.

After generating the candidate predicted motion vector list for the PU of the CU, the video encoder may select a candidate predicted motion vector from the candidate predicted motion vector list and output a candidate predicted motion vector index in a bitstream. The selected candidate predicted motion vector may be a candidate predicted motion vector for generating a motion vector that most closely matches a predictor of a target PU that is being decoded. The candidate predicted motion vector index may indicate a position of the selected candidate predicted motion vector in the candidate predicted motion vector list. The video encoder may further generate a prediction picture block for the PU based on a reference block indicated by the motion information for the PU. The motion information for the PU may be determined based on motion information indicated by the selected candidate predicted motion vector. For example, in the merge mode, the motion information for the PU may be the same as the motion information indicated by the selected candidate predicted motion vector. In the AMVP mode, the motion information for the PU may be determined based on a motion vector difference for the PU and the motion information indicated by the selected candidate predicted motion vector. The video encoder may generate one or more residual picture blocks for the CU based on the prediction picture block for the PU of the CU and an original picture block for the CU. Then, the video encoder may encode the one or more residual picture blocks and output the one or more residual picture blocks in the bitstream.

The bitstream may include data identifying the selected candidate predicted motion vector in the candidate predicted motion vector list for the PU. The video decoder may determine the motion information for the PU based on the motion information indicated by the selected candidate predicted motion vector in the candidate predicted motion vector list for the PU. The video decoder may identify one or more reference blocks for the PU based on the motion information for the PU. After identifying the one or more reference blocks for the PU, the video decoder may generate the prediction picture block for the PU based on the one or more reference blocks for the PU. The video decoder may reconstruct the picture block for the CU based on the prediction picture block for the PU of the CU and the one or more residual picture blocks for the CU.

For ease of explanation, a position or a picture block may be described as having various spatial relationships with a CU or a PU. The description may be explained as follows: The position or the picture block has various spatial relationships with a picture block associated with the CU or the PU. In addition, a PU currently being decoded by the video decoder may be referred to as a current PU, and may also be referred to as a current to-be-processed picture block. Herein, a CU currently being decoded by the video decoder may be referred to as a current CU. Herein, a picture currently being decoded by the video decoder may be referred to as a current picture. It should be understood that this application is also applicable to a case in which a PU and a CU have a same size, or a PU is a CU, and the PU is uniformly used for description.

As described briefly above, the video encoder 20 may generate the prediction picture block and the motion information for the PU of the CU through inter prediction. In some embodiments, motion information for a given PU may be the same as or similar to motion information for one or more adjacent PUs (namely, a PU whose picture block is spatially or temporally adjacent to a picture block of the given PU). Because the adjacent PU often has similar motion information, the video encoder 20 may encode the motion information for the given PU based on the motion information for the adjacent PU. Encoding the motion information for the given PU based on the motion information for the adjacent PU can reduce a quantity of coded bits required in the bitstream for indicating the motion information for the given PU.

The video encoder 20 may encode the motion information for the given PU based on the motion information for the adjacent PU in various manners. For example, the video encoder 20 may indicate that the motion information for the given PU is the same as the motion information for the adjacent PU. In an embodiment, the merge mode may be used to indicate that the motion information for the given PU is the same as or may be derived from the motion information for the adjacent PU. In another embodiment, the video encoder 20 may calculate a motion vector difference (MVD) for the given PU. The MVD indicates a difference between a motion vector for the given PU and a motion vector for the adjacent PU. The video encoder 20 may include the MVD instead of the motion vector for the given PU in the motion information for the given PU. In the bitstream, a quantity of coded bits required for representing the MVD is less than a quantity of coded bits required for representing the motion vector for the given PU. In an embodiment, the advanced motion vector prediction mode may be used to indicate that the motion information for the given PU is signaled to a decoder by using the MVD and an index value that is used for identifying a candidate motion vector.

To signal, in the merge mode or the AMVP mode, the motion information for the given PU to the decoder, the video encoder 20 may generate a candidate predicted motion vector list for the given PU. The candidate predicted motion vector list may include one or more candidate predicted motion vectors. Each of the candidate predicted motion vectors in the candidate predicted motion vector list for the given PU may specify motion information. The motion information indicated by each candidate predicted motion vector may include a motion vector, a reference picture index, and a prediction direction identifier. The candidate predicted motion vectors in the candidate predicted motion vector list may include original candidate predicted motion vectors, and each original candidate predicted motion vector indicates motion information of one of specified candidate predicted motion vector positions within a PU different from the given PU.

After generating the candidate predicted motion vector list for the PU, the video encoder 20 may select one candidate predicted motion vector from the candidate predicted motion vector list for the PU. For example, the video encoder may compare each candidate predicted motion vector with a PU being decoded and may select a candidate predicted motion vector with a desired rate-distortion cost. The video encoder 20 may output a candidate predicted motion vector index for the PU. The candidate predicted motion vector index may identify a position of the selected candidate predicted motion vector in the candidate predicted motion vector list.

In addition, the video encoder 20 may generate a prediction picture block for the PU based on a reference block indicated by the motion information for the PU. The motion information for the PU may be determined based on motion information indicated by the selected candidate predicted motion vector in the candidate predicted motion vector list for the PU. For example, in the merge mode, the motion information for the PU may be the same as the motion information indicated by the selected candidate predicted motion vector. In the AMVP mode, the motion information for the PU may be determined based on the motion vector difference for the PU and the motion information indicated by the selected candidate predicted motion vector. As described above, the video encoder 20 may process the prediction picture block for the PU.

When the video decoder 30 receives the bitstream, the video decoder 30 may generate a candidate predicted motion vector list for each PU of the CU. The candidate predicted motion vector list generated by the video decoder 30 for the PU may be the same as the candidate predicted motion vector list generated by the video encoder 20 for the PU. A syntax element obtained by parsing the bitstream may indicate the position of the selected candidate predicted motion vector in the candidate predicted motion vector list for the PU. After generating the candidate predicted motion vector list for the PU, the video decoder 30 may generate the prediction picture block for the PU based on the one or more reference blocks indicated by the motion information for the PU. The video decoder 30 may determine the motion information for the PU based on the motion information indicated by the selected candidate predicted motion vector in the candidate predicted motion vector list for the PU. The video decoder 30 may reconstruct the picture block for the CU based on the prediction picture block for the PU and the residual picture block for the CU.

It should be understood that, in an embodiment, on the decoder, constructing the candidate predicted motion vector list and parsing of the bitstream to obtain the position of the selected candidate predicted motion vector in the candidate predicted motion vector list are independent of each other, and may be performed in any order or in parallel.

In another embodiment, on the decoder, the position of the selected candidate predicted motion vector in the candidate predicted motion vector list is first obtained by parsing the bitstream, and then the candidate predicted motion vector list is constructed based on the position obtained through parsing. In this embodiment, it is not necessary to construct all candidate predicted motion vector lists, and only a candidate predicted motion vector list in the position obtained through parsing needs to be constructed, to be specific, provided that the candidate predicted motion vector in the position can be determined. For example, when it is obtained, by parsing the bitstream, that the selected candidate predicted motion vector is a candidate predicted motion vector whose index is 3 in the candidate predicted motion vector list, only a candidate predicted motion vector list from an index 0 to the index 3 needs to be constructed, and the candidate predicted motion vector whose index is 3 can be determined. This can reduce complexity and improve decoding efficiency.

Figure 2:
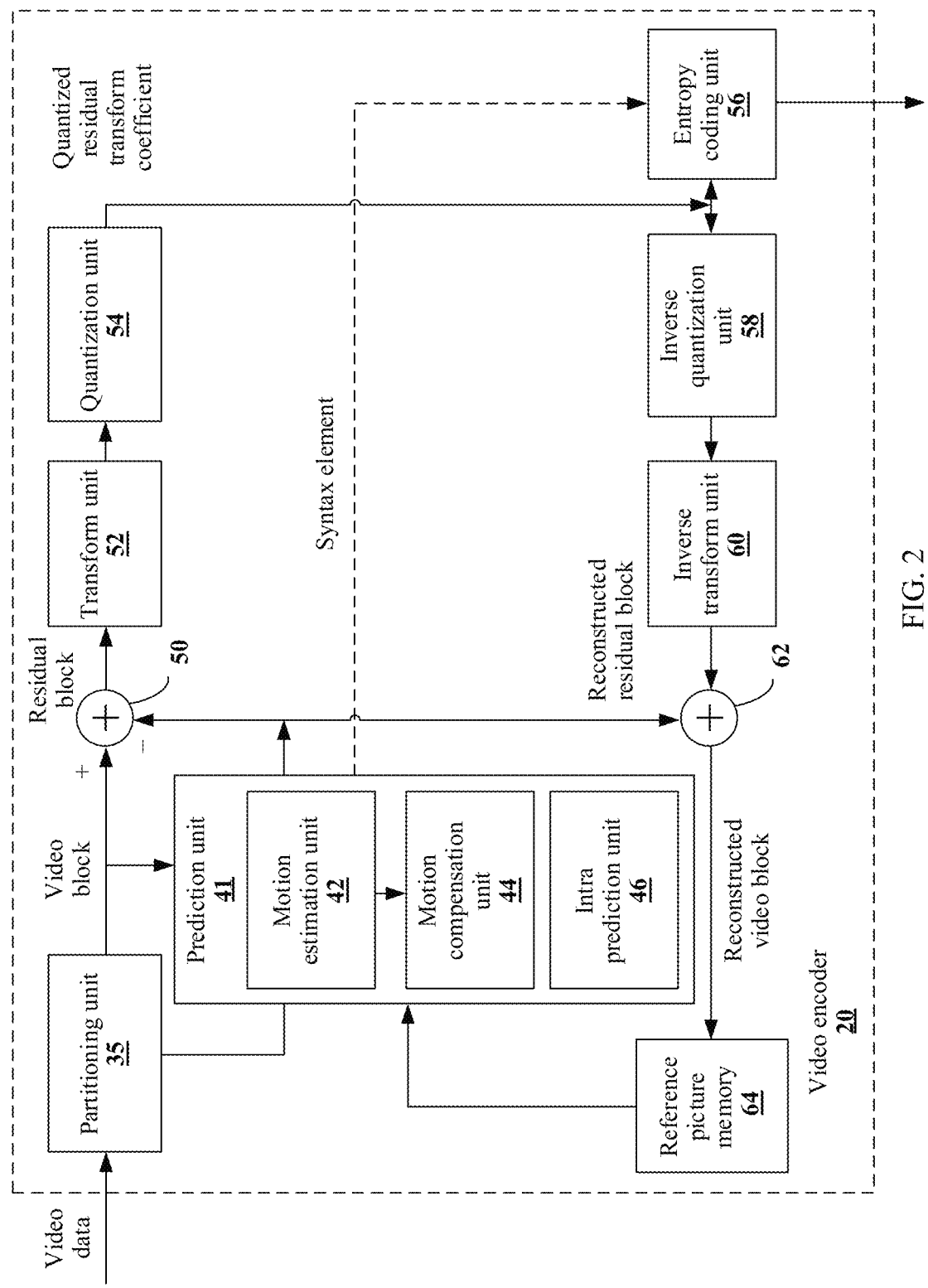
FIG. 2 is a system block diagram of an example of a video encoder according to an embodiment.

FIG. 2 is a schematic block diagram of a video encoder according to an embodiment. In FIG. 2, video encoder 20 may perform intra encoding and inter encoding on a video block in a video slice. Intra encoding relies on spatial prediction to reduce or remove spatial redundancy of a video in a given video frame or picture. Inter encoding relies on temporal prediction to reduce or remove temporal redundancy of a video in an adjacent frame or picture of a video sequence. An intra mode (I mode) may be any one of several space-based compression modes. An inter mode, such as a unidirectional prediction mode (P mode) or a bidirectional prediction mode (B mode), may be any one of several time-based compression modes.

In an embodiment, the video encoder 20 includes a partitioning unit 35, a prediction unit 41, a reference picture memory 64, a summator 50, a transform processing unit 52, a quantization unit 54, and an entropy coding unit 56. The prediction unit 41 includes a motion estimation unit 42, a motion compensation unit 44, and an intra prediction unit 46. For video block reconstruction, the video encoder 20 further includes an inverse quantization unit 58, an inverse transform unit 60, and a summator 62. The video encoder 20 may further include a deblocking filter (not shown in FIG. 2) to filter a block boundary, to remove a blocking artifact from a reconstructed video. When necessary, the deblocking filter usually filters an output of the summator 62. In addition to the deblocking filter, an additional loop filter (within or after a loop) may also be used.

As shown in FIG. 2, the video encoder 20 receives video data, and the partitioning unit 35 partitions the data into video blocks. Such partitioning may further include partitioning into slices, picture blocks, or other larger units, for example, video block partitioning based on quadtree structures of an LCU and a CU. For example, the video encoder 20 is a component for encoding a video block in a to-be-encoded video slice. Usually, one slice may be partitioned into a number of video blocks (and may be partitioned into sets of video blocks that are referred to as picture blocks).

The prediction unit 41 may select one of a number of possible decoding modes, for example, one of a number of intra decoding modes or one of a number of inter decoding modes, for a current video block based on encoding quality and a cost calculation result (for example, a rate-distortion cost, RDcost, or referred to as a rate distortion cost). The prediction unit 41 may provide an obtained intra decoded or inter decoded block to the summator 50 to generate residual block data, and provide the obtained intra decoded or inter decoded block to the summator 62 to reconstruct an encoded block and use the reconstructed encoded block as a reference picture.

The motion estimation unit 42 and the motion compensation unit 44 in the prediction unit 41 perform inter prediction decoding on the current video block relative to one or more prediction blocks of one or more reference pictures, to provide time compression. The motion estimation unit 42 may be configured to determine an inter prediction mode for the video slice based on a preset mode of the video sequence. In the preset mode, the video slice in the sequence may be specified as a P slice, a B slice, or a GPB slice. The motion estimation unit 42 and the motion compensation unit 44 may be highly integrated, but are described separately to explain concepts. Motion estimation performed by the motion estimation unit 42 is a process of generating a motion vector for estimating the video block. For example, the motion vector may indicate a displacement of a PU of a video block in a current video frame or picture relative to a prediction block in a reference picture.

A prediction block is a block in a PU that is found, based on a pixel difference, to be closely matched with a to-be-decoded video block. The pixel difference may be determined based on a sum of absolute differences (SAD), a sum of squared differences (SSD), or another difference metric. In some embodiments, the video encoder 20 may calculate a value of a sub-integer pixel position of a reference picture stored in the reference picture memory 64. For example, the video encoder 20 may interpolate a value of a ¼ pixel position, a ⅛ pixel position, or another fractional pixel position of the reference picture. Therefore, the motion estimation unit 42 may perform motion search with respect to a full pixel position and a fractional pixel position, and output a motion vector with fractional pixel precision.

The motion estimation unit 42 calculates a motion vector for a PU of a video block in an inter decoded slice by comparing a position of the PU and a position of a prediction block in a reference picture. The reference picture may be selected from a first reference picture list (a list 0) or a second reference picture list (a list 1). Each item in the list is used to identify one or more reference pictures stored in the reference picture memory 64. The motion estimation unit 42 sends the calculated motion vector to the entropy coding unit 56 and the motion compensation unit 44.

Motion compensation performed by the motion compensation unit 44 may include extracting or generating a prediction block based on the motion vector determined through motion estimation, and interpolation at a sub-pixel level may be performed. After receiving the motion vector of the PU of the current video block, the motion compensation unit 44 may locate the prediction block pointed to by the motion vector in one of the reference picture lists. The video encoder 20 subtracts a pixel value of the prediction block from a pixel value of the current video block being decoded, to obtain a residual video block, and obtain the pixel difference. The pixel difference constitutes residual data of the block, and may include both a luminance difference component and a chrominance difference component. The summator 50 is one or more components that perform the subtraction operation. The motion compensation unit 44 may further generate a syntax element associated with the video block and the video slice, for a video decoder 30 to decode the video block in the video slice.

If the PU is located in the B slice, a picture including the PU may be associated with the two reference picture lists referred to as the list 0 and the list 1. In some embodiments, the picture including the B slice may be associated with a list combination of the list 0 and the list 1.

In addition, if the PU is located in the B slice, the motion estimation unit 42 may perform unidirectional prediction or bidirectional prediction for the PU. In some embodiments, bidirectional prediction is prediction separately performed based on pictures in the reference picture list 0 and pictures in the reference picture list 1. In other embodiments, bidirectional prediction is prediction separately performed based on a reconstructed future frame and a reconstructed past frame that are of a current frame in a display order. When the motion estimation unit 42 performs unidirectional prediction for the PU, the motion estimation unit 42 may search the reference pictures in the list 0 or the list 1 for a reference block for the PU. Then, the motion estimation unit 42 may generate a reference index indicating a reference picture including the reference block in the list 0 or the list 1, and a motion vector indicating a spatial displacement between the PU and the reference block. The motion estimation unit 42 may output the reference index, a prediction direction identifier, and the motion vector as motion information for the PU. The prediction direction identifier may indicate that the reference index indicates the reference picture in the list 0 or the list 1. The motion compensation unit 44 may generate a prediction picture block for the PU based on the reference block indicated by the motion information for the PU.

When the motion estimation unit 42 performs bidirectional prediction for the PU, the motion estimation unit 42 may search the reference pictures in the list 0 for a reference block for the PU, and may further search the reference pictures in the list 1 for another reference block for the PU. Then, the motion estimation unit 42 may generate reference indexes indicating reference pictures including the reference blocks in the list 0 and the list 1, and motion vectors indicating spatial displacements between the reference blocks and the PU. The motion estimation unit 42 may output the reference indexes and the motion vectors for the PU as motion information for the PU. The motion compensation unit 44 may generate a prediction picture block for the PU based on the reference blocks indicated by the motion information for the PU.

In some embodiments, the motion estimation unit 42 does not output a complete set of the motion information for the PU to the entropy coding unit 56. Instead, the motion estimation unit 42 may signal the motion information for the PU with reference to motion information for another PU. For example, the motion estimation unit 42 may determine that the motion information for the PU is similar to motion information for an adjacent PU. In this embodiment, the motion estimation unit 42 may indicate an indicator value in a syntax structure associated with the PU, and the indicator value indicates, to the video decoder 30, that the motion information for the PU is the same as or may be derived from the motion information for the adjacent PU. In another embodiment, the motion estimation unit 42 may identify, in the syntax structure associated with the PU, a candidate predicted motion vector and a motion vector difference (MVD) that are associated with the adjacent PU. The MVD indicates a difference between the motion vector for the PU and the indicated candidate predicted motion vector associated with the adjacent PU. The video decoder 30 may use the indicated candidate predicted motion vector and the MVD to determine the motion vector for the PU.

As described above, the prediction unit 41 may generate a candidate predicted motion vector list for each PU of a CU. One or more of the candidate predicted motion vector lists may include one or more original candidate predicted motion vectors and one or more additional candidate predicted motion vectors derived from the one or more original candidate predicted motion vectors.

The intra prediction unit 46 in the prediction unit 41 may perform intra prediction decoding on the current video block relative to one or more adjacent blocks that are in a same picture or slice as the to-be-decoded current block, to provide spatial compression. Therefore, as an alternative of inter prediction (as described above) performed by the motion estimation unit 42 and the motion compensation unit 44, the intra prediction unit 46 may perform intra prediction on the current block. For example, the intra prediction unit 46 may determine an intra prediction mode for encoding the current block. In some embodiments, the intra prediction unit 46 may, for example, use various intra prediction modes to encode the current block during separate encoding traversal, and the intra prediction unit 46 (or a mode selection unit 40 in some embodiments) may select an appropriate intra prediction mode from tested modes.

After the prediction unit 41 generates a prediction block of the current video block through inter prediction or intra prediction, the video encoder 20 subtracts the prediction block from the current video block, to obtain a residual video block. Residual video data in the residual block may be included in one or more TUs, and applied to the transform processing unit 52. The transform processing unit 52 performs transform, for example, discrete cosine transform (DCT) or conceptually similar transform (for example, discrete sine transform (DST)) to transform the residual video data into residual transform coefficients. The transform processing unit 52 may transform the residual video data from pixel domain data to transform domain (for example, frequency domain) data.

The transform processing unit 52 may send the obtained transform coefficients to the quantization unit 54. The quantization unit 54 quantizes the transform coefficients to further reduce a bit rate. The quantization process can reduce a bit depth associated with some or all of the coefficients. A quantization degree may be modified by adjusting a quantization parameter. In some embodiments, the quantization unit 54 then may scan a matrix including a quantized transform coefficient. Alternatively, the entropy coding unit 56 may perform the scanning.

After quantization, the entropy coding unit 56 may perform entropy coding on the quantized transform coefficient. For example, the entropy coding unit 56 may perform context-adaptive variable-length decoding (CAVLC), context-adaptive binary arithmetic decoding (CABAC), syntax-based context-adaptive binary arithmetic decoding (SBAC), probability interval partitioning entropy (PIPE) decoding, or another entropy coding method or technology. The entropy coding unit 56 may further perform entropy coding on a motion vector and another syntax element of a current video slice that is being decoded. After the entropy coding unit 56 performs entropy coding, an encoded bitstream may be transmitted to the video decoder 30, or archived for subsequent transmission or for research by the video decoder 30.

The entropy coding unit 56 may encode information indicating, according to the technology in this application, the selected intra prediction mode. The video encoder 20 may include, in transmitted bitstream configuration data that may include a plurality of intra prediction mode index tables and a plurality of modified intra prediction mode index tables (also referred to as codeword mapping tables), definitions of encoding contexts of various blocks, and indications of an MPM, an intra prediction mode index table, and a modified intra prediction mode index table that are used for each of the contexts.

The inverse quantization unit 58 and the inverse transform unit 60 respectively perform inverse quantization and inverse transform, to reconstruct the residual block in pixel domain to be subsequently used as a reference block of the reference picture. The motion compensation unit 44 may calculate the reference block by adding the residual block and a prediction block in one reference picture in one of the reference picture lists. The motion compensation unit 44 may also apply one or more interpolation filters to a reconstructed residual block, to calculate a sub-integer pixel value for motion estimation. The summator 62 adds the reconstructed residual block and a motion compensated prediction block generated by the motion compensation unit 44 to generate the reference block, and the reference block is stored into the reference picture memory 64. The reference block may be used by the motion estimation unit 42 and the motion compensation unit 44 as a reference block for performing inter prediction on a block in a subsequent video frame or picture.

Figure 3:
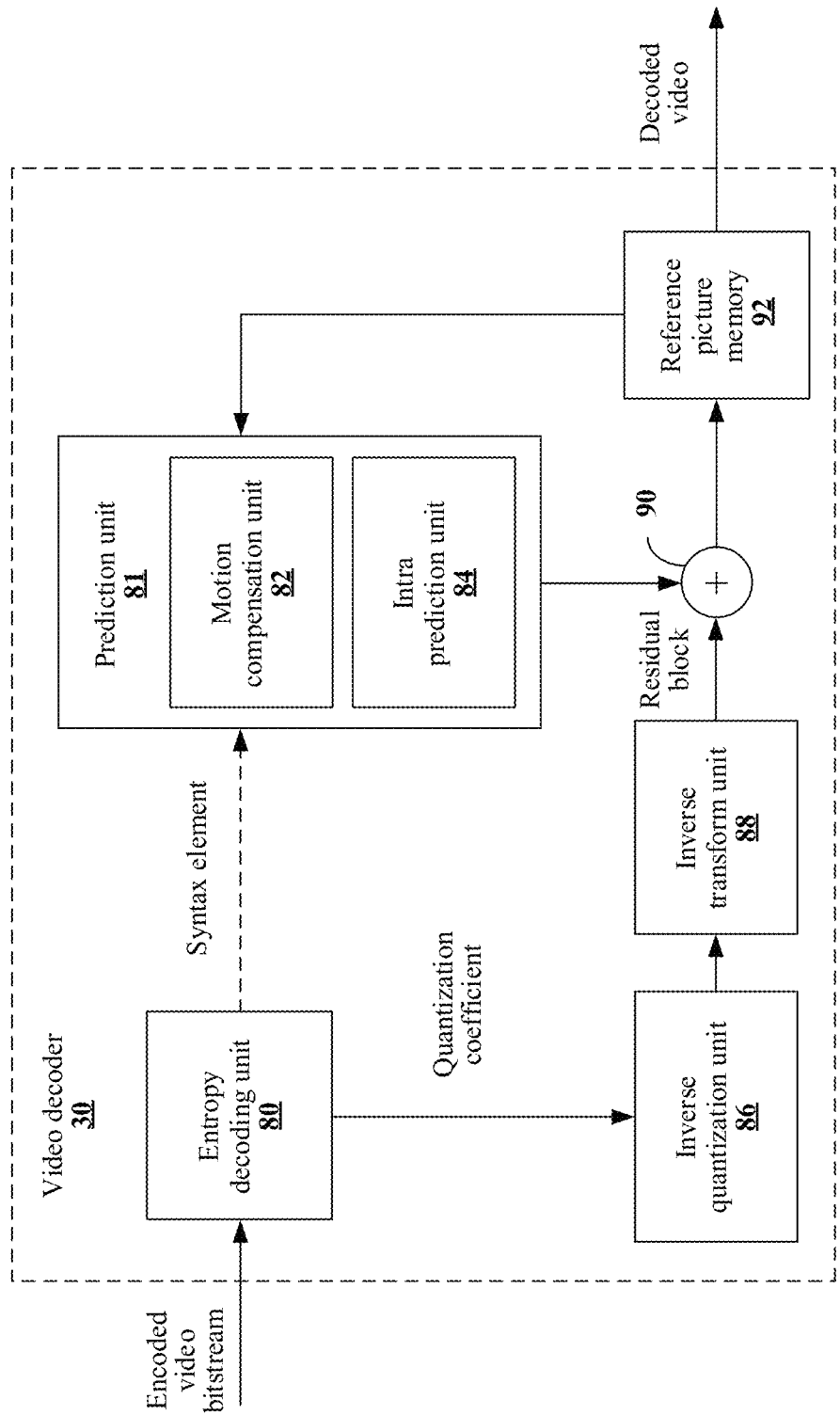
FIG. 3 is a system block diagram of an example of a video decoder according to an embodiment.

FIG. 3 is a schematic block diagram of a video decoder according to an embodiment. In an embodiment, video decoder 30 includes an entropy decoding unit 80, a prediction unit 81, an inverse quantization unit 86, an inverse transform unit 88, a summator 90, and a reference picture memory 92. The prediction unit 81 includes a motion compensation unit 82 and an intra prediction unit 84. In some embodiments, the video decoder 30 may perform an example decoding process inverse to the encoding process described with respect to the video encoder 20 in FIG. 4.

During decoding, the video decoder 30 receives, from the video encoder 20, an encoded video bitstream that represents a video block of an encoded video slice and associated syntax elements. The entropy coding unit 80 of the video decoder 30 performs entropy decoding on the bitstream to generate a quantized coefficient, a motion vector, and other syntax elements. The entropy coding unit 80 transfers the motion vector and the other syntax elements to the prediction unit 81. The video decoder 30 may receive the syntax elements at a video slice level and/or a video block level.

When the video slice is decoded into an intra decoded (I) slice, the intra prediction unit 84 of the prediction unit 81 may generate prediction data of the video block of the current video slice based on a signaled intra prediction mode and data of a previously decoded block of a current frame or picture.

When the video picture is decoded into an inter decoded slice (for example, a B slice, a P slice, or a GPB slice), the motion compensation unit 82 of the prediction unit 81 generates a prediction block of the video block of the current video picture based on the motion vector and the other syntax elements that are received from the entropy coding unit 80. The prediction block may be generated from one reference picture in one of reference picture lists. The video decoder 30 may use a default construction technology to construct the reference picture lists (e.g., list 0 and list 1) based on a reference picture stored in the reference picture memory 92.

The motion compensation unit 82 determines prediction information of the video block of the current video slice by parsing the motion vector and the other syntax elements, and uses the prediction information to generate the prediction block of the current video block being decoded. For example, the motion compensation unit 82 uses some of the received syntax elements to determine a prediction mode (for example, intra prediction or inter prediction) for decoding the video block of the video slice, an inter prediction slice type (for example, the B slice, the P slice, or the GPB slice), construction information of one or more of the reference picture lists of the slice, a motion vector of each inter encoded video block of the slice, an inter prediction status of each inter decoded video block of the slice, and other information for decoding the video block in the current video slice.

The motion compensation unit 82 may further perform interpolation by using an interpolation filter. The motion compensation unit 82 may use, for example, the interpolation filter used by the video encoder 20 during video block encoding, to calculate an interpolation value of a sub-integer pixel of a reference block. In an embodiment, the motion compensation unit 82 may determine, based on the received syntax elements, the interpolation filter used by the video encoder 20, and use the interpolation filter to generate the prediction block.

If a PU is encoded through inter prediction, the motion compensation unit 82 may generate a candidate predicted motion vector list for the PU. The bitstream may include data for identifying a position of a selected candidate predicted motion vector in the candidate predicted motion vector list for the PU. After generating the candidate predicted motion vector for the PU, the motion compensation unit 82 may generate a prediction picture block for the PU based on one or more reference blocks indicated by motion information for the PU. The reference block for the PU may be located in a time picture different from a time picture of the PU. The motion compensation unit 82 may determine the motion information for the PU based on selected motion information in the candidate predicted motion vector list for the PU.

The inverse quantization unit 86 performs inverse quantization (for example, dequantization) on a quantized transform coefficient that is provided in the bitstream and decoded by the entropy coding unit 80. The inverse quantization process may include: determining a quantization degree based on a quantization parameter calculated by the video encoder 20 for each video block in the video slice, and similarly determining a to-be-applied inverse quantization degree. The inverse transform unit 88 performs inverse transform (for example, inverse DCT, inverse integer transform, or a conceptually similar inverse transform process) on the transform coefficient to generate a pixel-domain residual block.

After the motion compensation unit 82 generates the prediction block of the current video block based on the motion vector and the other syntax elements, the video decoder 30 adds the residual block from the inverse transform unit 88 and the corresponding prediction block generated by the motion compensation unit 82, to constitute a decoded video block. The summator 90 is one or more components that perform the summation operation. When necessary, a deblocking filter may further be used to filter the decoded block to remove a blocking artifact. Another loop filter (in or after a decoding loop) may further be used to smoothen pixels, or video quality may be improved in another manner. Then, a decoded video block in a given frame or picture is stored into the reference picture memory 92. The reference picture memory 92 stores a reference picture used for subsequent motion compensation. The reference picture memory 92 further stores a decoded video to be subsequently displayed on a display apparatus such as the display apparatus 32 in FIG. 1.

As described above, the technologies in this application relate to, for example, inter decoding. It should be understood that the technologies described herein may be performed by any video codec described herein, and the video decoder includes, for example, the video encoder 20 and the video decoder 30 shown and described in FIG. 1 to FIG. 3. In an embodiment, the prediction unit 41 described in FIG. 2 may perform a particular technology described below when inter prediction is performed during encoding of a block of video data. In another embodiment, the prediction unit 81 described in FIG. 3 may perform a particular technology described below when inter prediction is performed during decoding of a block of video data. Therefore, a reference to a general "video encoder" or "video decoder" may include the video encoder 20, the video decoder 30, or another video encoding unit or decoding unit.

Figure 4:
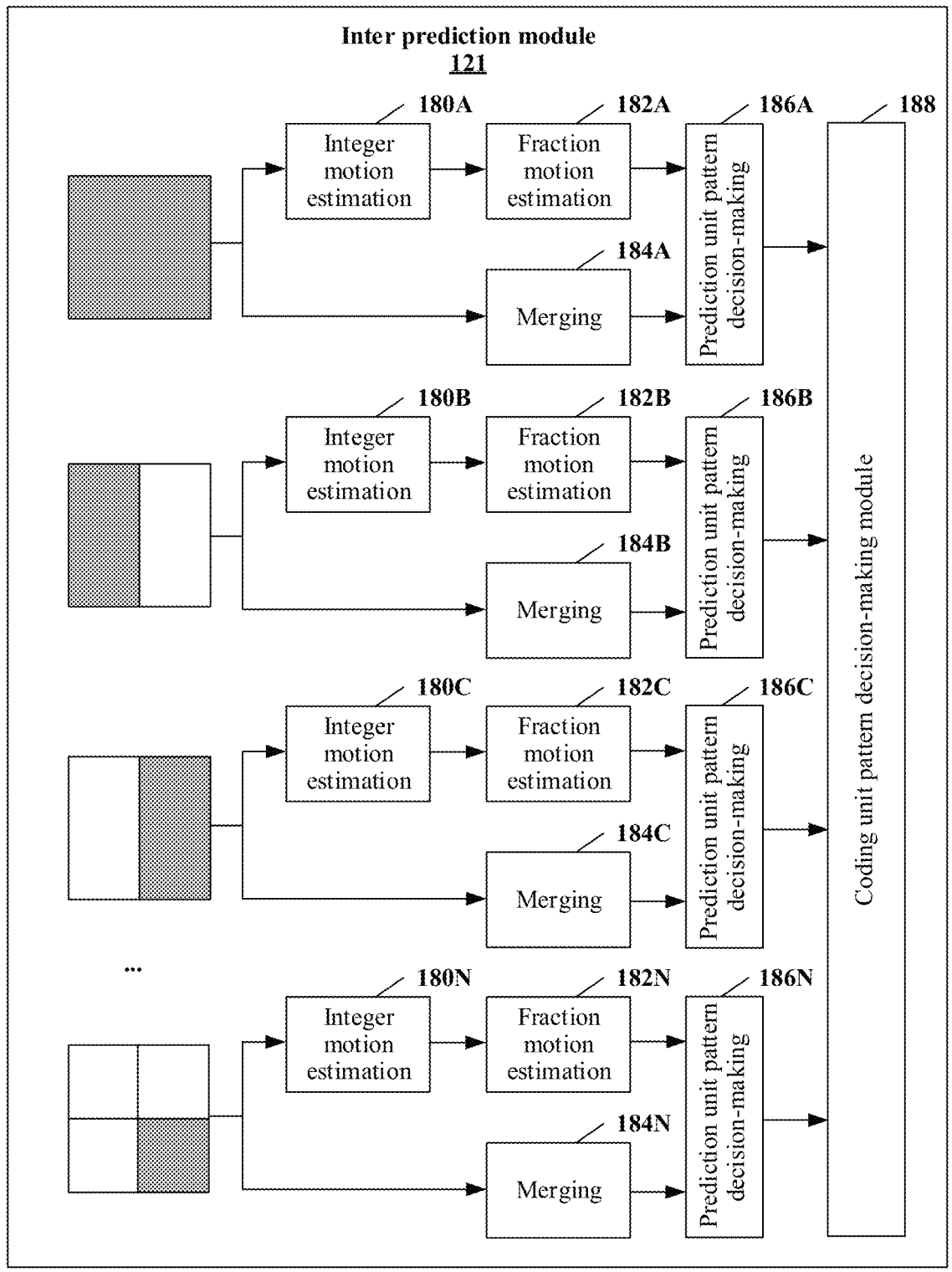
FIG. 4 is a block diagram of an example of an inter prediction module according to an embodiment.

FIG. 4 is a schematic block diagram of an inter prediction module according to an embodiment. Referring to FIG. 4, inter prediction module 121, for example, may include a motion estimation unit 42 and a motion compensation unit 44. A relationship between a PU and a CU varies with a video compression coding standard. The inter prediction module 121 may partition a current CU into PUs according to a plurality of partitioning patterns. For example, the inter prediction module 121 may partition the current CU into the PUs according to 2N×2N, 2N×N, N×2N, and N×N partitioning patterns. In another embodiment, the current CU is a current PU, and this is not limited.

The inter prediction module 121 may perform integer motion estimation (IME) and then fraction motion estimation (FME) on each PU. When the inter prediction module 121 performs IME on the PU, the inter prediction module 121 may search one or more reference pictures for a reference block for the PU. After finding the reference block for the PU, the inter prediction module 121 may generate a motion vector that indicates, with integer precision, a spatial displacement between the PU and the reference block for the PU. When the inter prediction module 121 performs FME on the PU, the inter prediction module 121 may improve the motion vector generated by performing IME on the PU. A motion vector generated by performing FME on the PU may have sub-integer precision (for example, ½ pixel precision or ¼ pixel precision). After generating the motion vector for the PU, the inter prediction module 121 may generate a prediction picture block for the PU by using the motion vector for the PU.

In some embodiments, to signal motion information for the PU to a decoder in an AMVP mode, the inter prediction module 121 may generate a candidate predicted motion vector list for the PU. The candidate predicted motion vector list may include one or more original candidate predicted motion vectors and one or more additional candidate predicted motion vectors derived from the one or more original candidate predicted motion vectors. After generating the candidate predicted motion vector list for the PU, the inter prediction module 121 may select a candidate predicted motion vector from the candidate predicted motion vector list and generate a motion vector difference (MVD) for the PU. The MVD for the PU may indicate a difference between a motion vector indicated by the selected candidate predicted motion vector and the motion vector generated for the PU through IME and FME. In some embodiments, the inter prediction module 121 may output a candidate predicted motion vector index identifying a position of the selected candidate predicted motion vector in the candidate predicted motion vector list. The inter prediction module 121 may further output the MVD for the PU. The following describes in detail an embodiment of the advanced motion vector prediction (AMVP) mode in FIG. 6.

In addition to performing IME and FME on the PU to generate the motion information for the PU, the inter prediction module 121 may further perform a merge operation on the PU. When the inter prediction module 121 performs the merge operation on the PU, the inter prediction module 121 may generate a candidate predicted motion vector list for the PU. The candidate predicted motion vector list for the PU may include one or more original candidate predicted motion vectors and one or more additional candidate predicted motion vectors derived from the one or more original candidate predicted motion vectors. The original candidate predicted motion vectors in the candidate predicted motion vector list may include one or more spatial candidate predicted motion vectors and temporal candidate predicted motion vectors. The spatial candidate predicted motion vector may indicate motion information for another PU in a current picture. The temporal candidate predicted motion vector may be based on motion information for a corresponding PU in a picture different from the current picture. The temporal candidate predicted motion vector may also be referred to as temporal motion vector prediction (TMVP).

Figure 5:
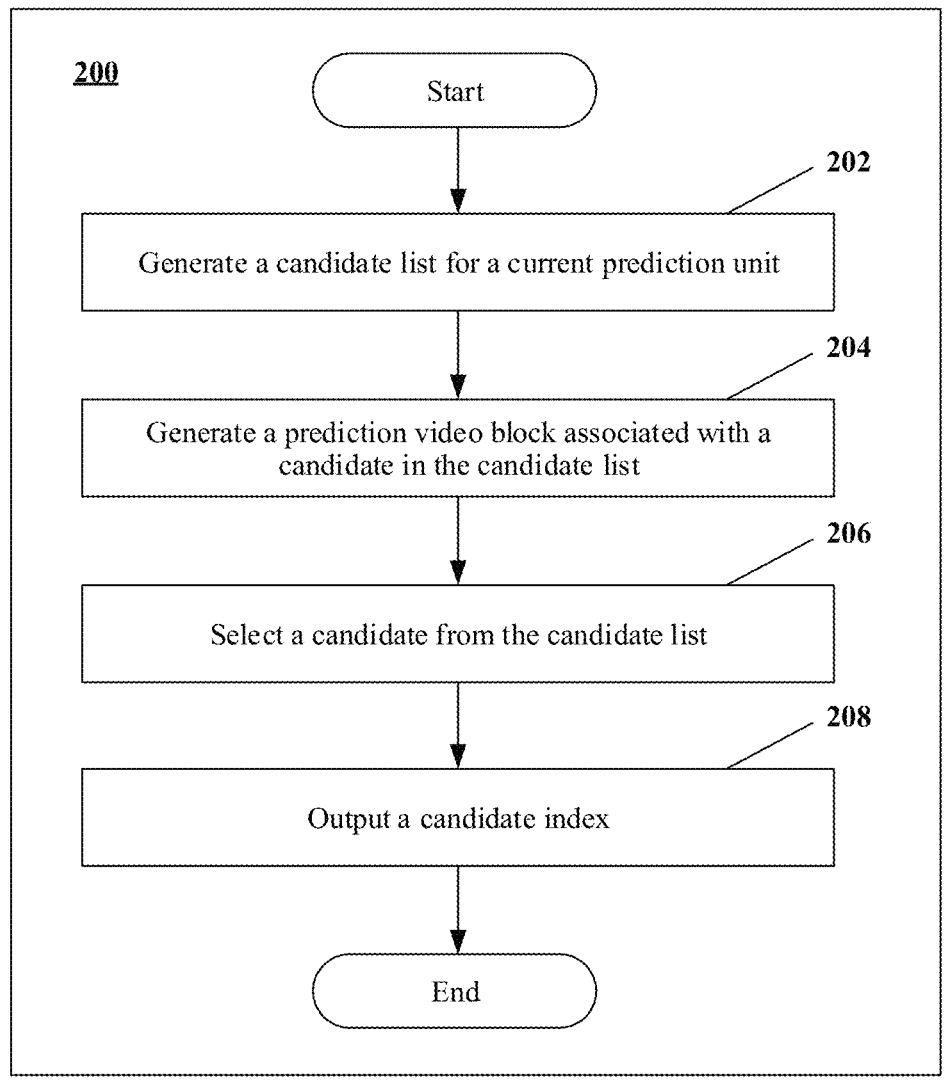
FIG. 5 is a flowchart of an example process of a merge prediction mode.

After generating the candidate predicted motion vector list, the inter prediction module 121 may select one candidate predicted motion vector from the candidate predicted motion vector list. Then, the inter prediction module 121 may generate a prediction picture block for the PU based on the reference block indicated by the motion information for the PU. In the merge mode, the motion information for the PU may be the same as motion information indicated by the selected candidate predicted motion vector. FIG. 5 described below is a flowchart of an example of the merge mode.

After generating the prediction picture block for the PU through IME and FME and generating the prediction picture block for the PU through the merge operation, the inter prediction module 121 may select the prediction picture block generated by performing the FME operation or the prediction picture block generated by performing the merge operation. In some embodiments, the inter prediction module 121 may select the prediction picture block for the PU by analyzing rate-distortion costs of the prediction picture block generated by performing the FME operation and the prediction picture block generated by performing the merge operation.

After the inter prediction module 121 has selected a prediction picture block of a PU generated by partitioning the current CU according to each partitioning pattern (in some embodiments, after a coding tree unit CTU is partitioned into CUs, the CU is not further partitioned into smaller PUs, and in this case, the PU is equivalent to the CU), the inter prediction module 121 may select a partitioning pattern for the current CU. In some embodiments, the inter prediction module 121 may select the partitioning pattern for the current CU by analyzing a rate-distortion cost of the selected prediction picture block of the PU generated by partitioning the current CU according to each partitioning pattern. The inter prediction module 121 may output a prediction picture block associated with a PU that belongs to the selected partitioning pattern to a residual generation module 102. The inter prediction module 121 may output a syntax element of motion information for the PU that belongs to the selected partitioning pattern to an entropy coding module 116.

In the schematic diagram shown in FIG. 4, the inter prediction module 121 includes IME modules 180A to 180N (collectively referred to as an "IME module 180"), FME modules 182A to 182N (collectively referred to as an "FME module 182"), merge modules 184A to 184N (collectively referred to as a "merge module 184"), PU pattern decision-making modules 186A to 186N (collectively referred to as a "PU pattern decision-making module 186"), and a CU pattern decision-making module 188 (and may further perform a CTU-to-CU pattern decision-making process).

The IME module 180, the FME module 182, and the merge module 184 may respectively perform an IME operation, an FME operation, and a merge operation on the PU of the current CU. In the schematic diagram shown in FIG. 4, the inter prediction module 121 is described as including a separate IME module 180, a separate FME module 182, and a separate merge module 184 for each PU in each partitioning pattern for the CU. In another embodiment, the inter prediction module 121 does not include the separate IME module 180, the separate FME module 182, or the separate merge module 184 for each PU in each partitioning pattern of the CU.

As illustrated in the schematic diagram shown in FIG. 4, the IME module 180A, the FME module 182A, and the merge module 184A may respectively perform an IME operation, an FME operation, and a merge operation on a PU generated by partitioning the CU according to the 2N×2N partitioning pattern. The PU pattern decision-making module 186A may select one of prediction picture blocks generated by the IME module 180A, the FME module 182A, and the merge module 184A.

The IME module 180B, the FME module 182B, and the merge module 184B may respectively perform an IME operation, an FME operation, and a merge operation on the left PU generated by partitioning the CU according to the N×2N partitioning pattern. The PU pattern decision-making module 186B may select one of prediction picture blocks generated by the IME module 180B, the FME module 182B, and the merge module 184B.

The IME module 180C, the FME module 182C, and the merge module 184C may respectively perform an IME operation, an FME operation, and a merge operation on the right PU generated by partitioning the CU according to the N×2N partitioning pattern. The PU pattern decision-making module 186C may select one of prediction picture blocks generated by the IME module 180C, the FME module 182C, and the merge module 184C.

The IME module 180N, the FME module 182N, and the merge module 184N may respectively perform an IME operation, an FME operation, and a merge operation on the lower right PU generated by partitioning the CU according to the N×N partitioning pattern. The PU pattern decision-making module 186N may select one of prediction picture blocks generated by the IME module 180N, the FME module 182N, and the merge module 184N.

The PU pattern decision-making module 186 may select a prediction picture block by analyzing rate-distortion costs of a number of possible prediction picture blocks, and select a prediction picture block that provides an optimal rate-distortion cost in a given decoding scenario. For example, for an application with limited bandwidth, the PU pattern decision-making module 186 may prefer a prediction picture block for which a compression ratio is increased, and for another application, the PU pattern decision-making module 186 may prefer a prediction picture block for which quality of a reconstructed video is improved. After the PU pattern decision-making module 186 selects prediction picture blocks for the PUs of the current CU, the CU pattern decision-making module 188 selects the partitioning pattern for the current CU and outputs the prediction picture block and motion information for the PU that belongs to the selected partitioning pattern.

FIG. 5 is a flowchart of an example process of a merge mode according to an embodiment. A video encoder (for example, the video encoder 20) may perform a merge operation 200. In another embodiment, the video encoder may perform a merge operation different from the merge operation 200. For example, in another embodiment, the video encoder may perform a merge operation, where the video encoder performs steps more or less than steps of the merge operation 200 or steps different from the steps of the merge operation 200. In another embodiment, the video encoder may perform the steps of merge operation 200 in different orders or in parallel. The encoder may further perform the merge operation 200 on a PU encoded in a skip mode.

After the video encoder starts the merge operation 200, the video encoder may generate a candidate predicted motion vector list for a current PU (202). The video encoder may generate the candidate predicted motion vector list for the current PU in various manners. For example, the video encoder may generate, according to one of example technologies described below with respect to FIG. 8 to FIG. 12, the candidate predicted motion vector list for the current PU.

As described above, the candidate predicted motion vector list for the current PU may include a temporal candidate predicted motion vector. The temporal candidate predicted motion vector may indicate motion information for a corresponding time-domain co-located PU. The co-located PU may be spatially located at a same position as the current PU in a picture frame in a reference picture instead of a current picture. In this application, the reference picture including the corresponding time-domain PU may be referred to as a related reference picture. Herein, a reference picture index of the related reference picture may be referred to as a related reference picture index. As described above, the current picture may be associated with one or more reference picture lists (for example, list 0 and list 1). The reference picture index may indicate the reference picture by indicating a position of the reference picture in a reference picture list. In some embodiments, the current picture may be associated with a combined reference picture list.

In some video encoders, the related reference picture index is a reference picture index for a PU that covers a reference index source position associated with the current PU. In these video encoders, the reference index source position associated with the current PU is adjacent to the left of the current PU or adjacent to the top of the current PU.

In this application, if a picture block associated with a PU includes a specific position, the PU may cover the specific position. In these video encoders, the video encoder may use a reference picture index 0 if the reference index source position is unavailable.

However, in an example, the reference index source position associated with the current PU is within a current CU. In this example, a PU that covers the reference index source position associated with the current PU may be considered as available if the PU is above or on the left of the current CU. In this case, the video encoder may need to access motion information for another PU of the current CU to determine the reference picture including the co-located PU. Therefore, these video encoders may use motion information (for example, a reference picture index) for a PU belonging to the current CU to generate the temporal candidate predicted motion vector for the current PU. In other words, these video encoders may use the motion information for the PU belonging to the current CU to generate the temporal candidate predicted motion vector. Therefore, the video encoder may not be able to generate, in parallel, candidate predicted motion vector lists for the current PU and the PU that covers the reference index source position associated with the current PU.

According to the technologies described herein, the video encoder may explicitly set the related reference picture index without referring to a reference picture index for any other PU. In this way, the video encoder can generate, in parallel, candidate predicted motion vector lists for the current PU and another PU of the current CU. Because the video encoder explicitly sets the related reference picture index, the related reference picture index is not based on motion information for any other PU of the current CU. In some embodiments, in which the video encoder explicitly sets the related reference picture index, the video encoder may always set the related reference picture index to a fixed preset reference picture index (for example, 0). In this way, the video encoder may generate a temporal candidate predicted motion vector based on motion information for a co-located PU in a reference frame indicated by the preset reference picture index, where the temporal candidate predicted motion vector may be included in a candidate predicted motion vector list for the current CU.

In an embodiment, to set the related reference picture index, the video encoder may signal the related reference picture index in a syntax structure (for example, a picture header, a slice header, an APS, or another syntax structure). In an embodiment, the video encoder may signal a related reference picture index for each LCU (namely, a CTU), CU, PU, TU, or sub-block of another type to a decoder. For example, the video encoder may signal that a related reference picture index for each PU of the CU is equal to "1".

In some embodiments, the related reference picture index may be set implicitly rather than explicitly. In some embodiments, the video encoder may generate each temporal candidate predicted motion vector in the candidate predicted motion vector list for the PU of the current CU by using motion information for a PU in a reference picture indicated by a reference picture index for a PU that covers positions outside the current CU, even if these positions are not strictly adjacent to the current PU.

After generating the candidate predicted motion vector list for the current PU, the video encoder may generate a prediction picture block associated with a candidate predicted motion vector in the candidate predicted motion vector list (204). The video encoder may determine motion information for the current PU based on motion information of an indicated candidate predicted motion vector and then generate a prediction picture block based on one or more reference blocks indicated by the motion information for the current PU, to generate a prediction picture block associated with the candidate predicted motion vector. Then, the video encoder may select one candidate predicted motion vector from the candidate predicted motion vector list (206). The video encoder may select the candidate predicted motion vector in various manners. For example, the video encoder may select one candidate predicted motion vector by analyzing a rate-distortion cost of each prediction picture block associated with candidate predicted motion vectors.

After selecting the candidate predicted motion vector, the video encoder may output a candidate predicted motion vector index (208). The candidate predicted motion vector index may indicate a position of the selected candidate predicted motion vector in the candidate predicted motion vector list. In some embodiments, the candidate predicted motion vector index may be represented as "merge_idx".

Figure 6:
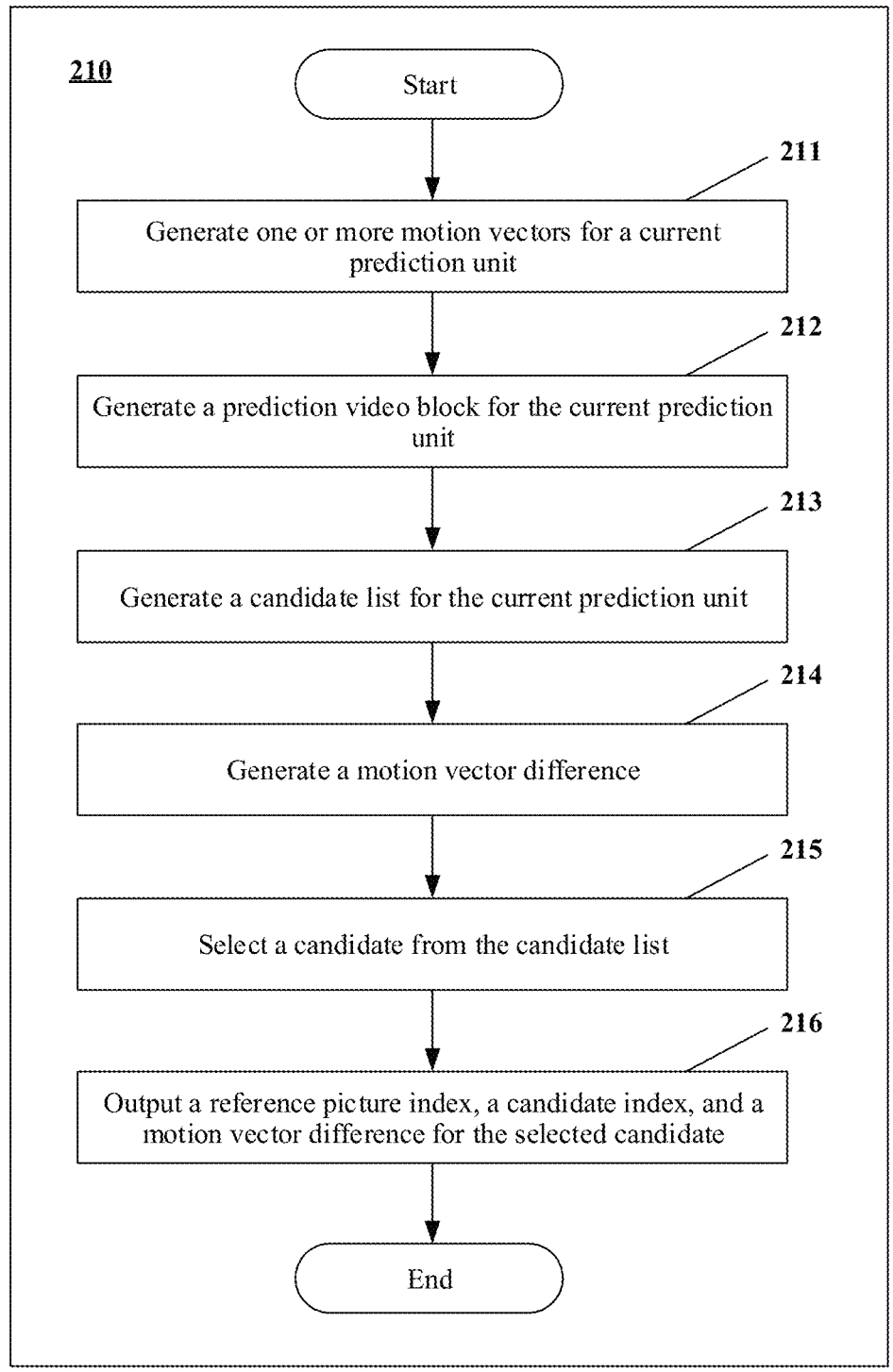
FIG. 6 is a flowchart of an example process of an advanced motion vector prediction mode.

FIG. 6 is a flowchart of an example process of an advanced motion vector prediction (AMVP) mode according to an embodiment. A video encoder (for example, the video encoder 20) may perform an AMVP operation 210.

After the video encoder starts the AMVP operation 210, the video encoder may generate one or more motion vectors for a current PU (211). The video encoder may perform integer motion estimation and fraction motion estimation to generate the motion vector for the current PU. As described above, a current picture may be associated with two reference picture lists (e.g., list 0 and list 1). If the current PU is predicted unidirectionally, the video encoder may generate a list-0 motion vector or a list-1 motion vector for the current PU. The list-0 motion vector may indicate a spatial displacement between a picture block corresponding to the current PU and a reference block in a reference picture in the list 0. The list-1 motion vector may indicate a spatial displacement between the picture block corresponding to the current PU and a reference block in a reference picture in the list 1. If the current PU is predicted bidirectionally, the video encoder may generate the list-0 motion vector and the list-1 motion vector for the current PU.

After generating the one or more motion vectors for the current PU, the video encoder may generate a prediction picture block for the current PU (212). The video encoder may generate the prediction picture block for the current PU based on one or more reference blocks indicated by the one or more motion vectors for the current PU.

In addition, the video encoder may generate a candidate predicted motion vector list for the current PU (213). The video encoder may generate the candidate predicted motion vector list for the current PU in various manners. For example, the video encoder may generate the candidate predicted motion vector list for the current PU according to one or more embodiments described below with respect to FIG. 8 to FIG. 12. In some embodiments, when the video encoder generates the candidate predicted motion vector list in the AMVP operation 210, the candidate predicted motion vector list may be limited to two candidate predicted motion vectors. In contrast, when the video encoder generates the candidate predicted motion vector list in a merge operation, the candidate predicted motion vector list may include more candidate predicted motion vectors (for example, five candidate predicted motion vectors).

After generating the candidate predicted motion vector list for the current PU, the video encoder may generate one or more motion vector differences (MVD) for each candidate predicted motion vector in the candidate predicted motion vector list (214). The video encoder may determine a difference between a motion vector indicated by a candidate predicted motion vector and a corresponding motion vector for the current PU, to generate a motion vector difference for the candidate predicted motion vector.

If the current PU is predicted unidirectionally, the video encoder may generate a single MVD for each candidate predicted motion vector. If the current PU is predicted bidirectionally, the video encoder may generate two MVDs for each candidate predicted motion vector. A first MVD may indicate a difference between a motion vector indicated by the candidate predicted motion vector and the list-0 motion vector for the current PU. A second MVD may indicate a difference between the motion vector indicated by the candidate predicted motion vector and the list-1 motion vector for the current PU.

The video encoder may select one or more candidate predicted motion vectors from the candidate predicted motion vector list (215). The video encoder may select the one or more candidate predicted motion vectors in various manners. For example, the video encoder may select a candidate predicted motion vector that matches, with a minimum error, an associated motion vector of a to-be-encoded motion vector. This can reduce a quantity of bits required for representing a motion vector difference for the candidate predicted motion vector.

After selecting the one or more candidate predicted motion vectors, the video encoder may output one or more reference picture indexes for the current PU, one or more candidate predicted motion vector indexes for the current PU, and one or more motion vector differences for the one or more selected candidate predicted motion vectors (216).

In an example in which the current picture is associated with the two reference picture lists (e.g., list 0 and list 1) and the current PU is predicted unidirectionally, the video encoder may output a reference picture index ("ref_idx_l0") for the list 0 or a reference picture index ("ref_idx_l1") for the list 1. The video encoder may further output a candidate predicted motion vector index ("mvp_l0_flag") that indicates a position of a selected candidate predicted motion vector of the list-0 motion vector for the current PU in the candidate predicted motion vector list. Alternatively, the video encoder may output a candidate predicted motion vector index ("mvp_l1_flag") that indicates a position of a selected candidate predicted motion vector of the list-1 motion vector for the current PU in the candidate predicted motion vector list. The video encoder may further output an MVD for the list-0 motion vector or the list-1 motion vector for the current PU.

In an example in which the current picture is associated with the two reference picture lists (e.g., list 0 and list 1) and the current PU is predicted bidirectionally, the video encoder may output a reference picture index ("ref_idx_l0") for the list 0 and a reference picture index ("ref_idx_l1") for the list 1. The video encoder may further output a candidate predicted motion vector index ("mvp_l0_flag") that indicates a position of a selected candidate predicted motion vector of the list-0 motion vector for the current PU in the candidate predicted motion vector list. In addition, the video encoder may output a candidate predicted motion vector index ("mvp_l1_flag") that indicates a position of a selected candidate predicted motion vector of the list-1 motion vector for the current PU in the candidate predicted motion vector list. The video encoder may further output an MVD for the list-0 motion vector for the current PU and an MVD for the list-1 motion vector for the current PU.

Figure 7:
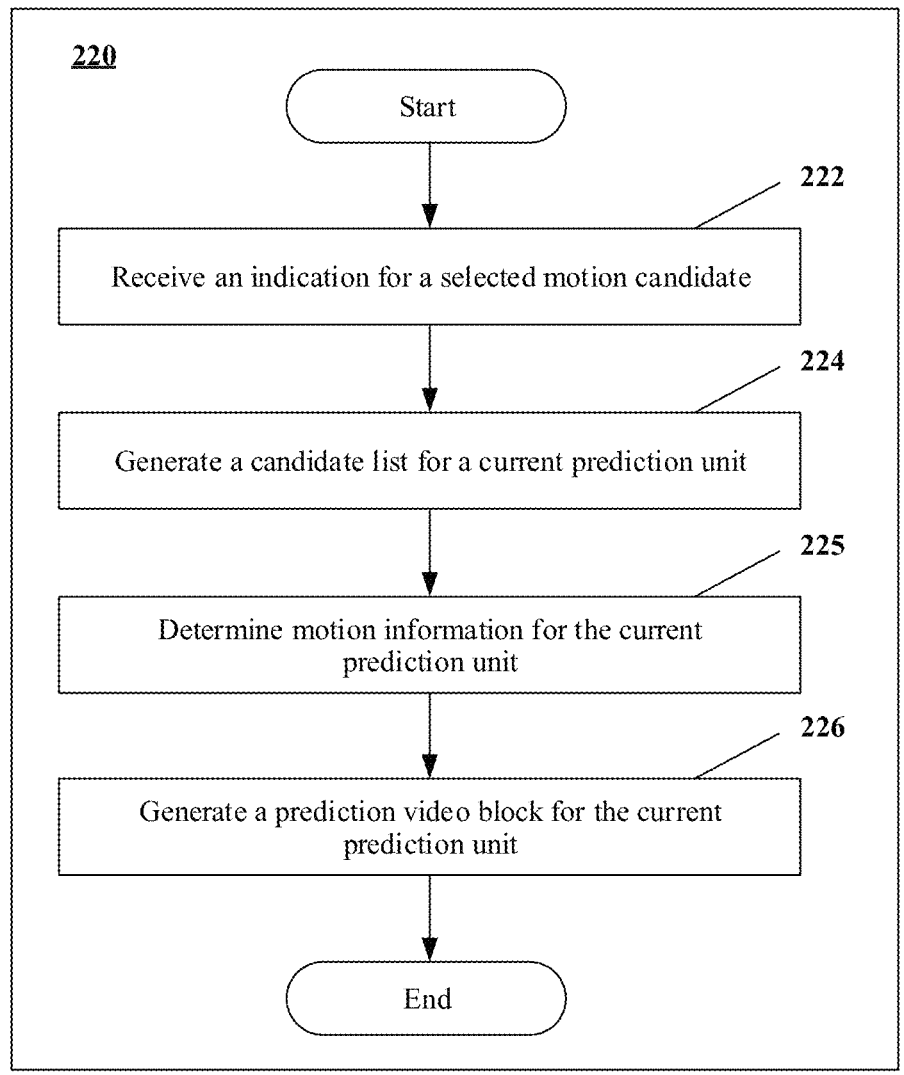
FIG. 7 is a flowchart of an example process of motion compensation by a video decoder according to an embodiment.

FIG. 7 is a flowchart of an example process of motion compensation performed by a video decoder (for example, the video decoder 30) according to an embodiment.

When the video decoder performs a motion compensation operation 220, the video decoder may receive an indication for a selected candidate predicted motion vector for a current PU (222). For example, the video decoder may receive a candidate predicted motion vector index indicating a position of the selected candidate predicted motion vector in a candidate predicted motion vector list for the current PU.

If motion information for the current PU is encoded in an AMVP mode and the current PU is predicted bidirectionally, the video decoder may receive a first candidate predicted motion vector index and a second candidate predicted motion vector index. The first candidate predicted motion vector index indicates a position of a selected candidate predicted motion vector of a list-0 motion vector for the current PU in the candidate predicted motion vector list. The second candidate predicted motion vector index indicates a position of a selected candidate predicted motion vector of a list-1 motion vector for the current PU in the candidate predicted motion vector list. In some embodiments, a single syntax element may be used to identify the two candidate predicted motion vector indexes.

In addition, the video decoder may generate the candidate predicted motion vector list for the current PU (224). The video decoder may generate the candidate predicted motion vector list for the current PU in various manners. For example, the video decoder may generate the candidate predicted motion vector list for the current PU by using technologies described below with reference to FIG. 8 to FIG. 12. When the video decoder generates a temporal candidate predicted motion vector for the candidate predicted motion vector list, the video decoder may explicitly or implicitly set a reference picture index identifying a reference picture including a co-located PU, as described above with respect to FIG. 5.

After generating the candidate predicted motion vector list for the current PU, the video decoder may determine the motion information for the current PU based on motion information indicated by one or more selected candidate predicted motion vectors in the candidate predicted motion vector list for the current PU (225). For example, if the motion information for the current PU is encoded in a merge mode, the motion information for the current PU may be the same as the motion information indicated by the selected candidate predicted motion vector. If the motion information for the current PU is encoded in the AMVP mode, the video decoder may reconstruct one or more motion vectors for the current PU by using one or more motion vectors indicated by one or more selected candidate predicted motion vector and one or more MVDs indicated in a bitstream. A reference picture index and a prediction direction identifier of the current PU may be the same as reference picture indexes and prediction direction identifiers of the one or more selected candidate predicted motion vectors. After determining the motion information for the current PU, the video decoder may generate a prediction picture block for the current PU based on one or more reference blocks indicated by the motion information for the current PU (226).

Figure 8:
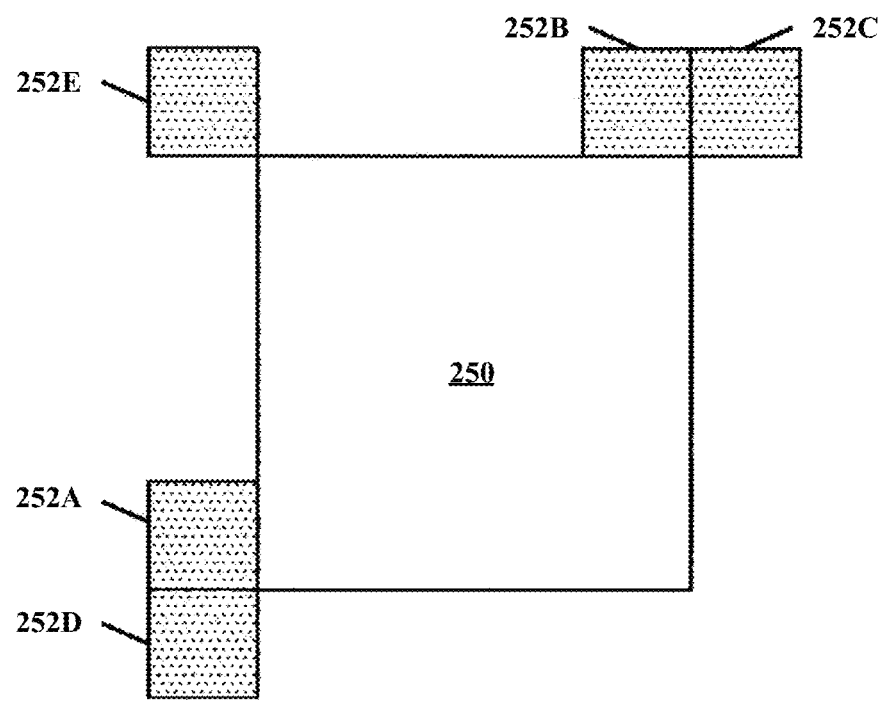
FIG. 8 is a schematic diagram of an example coding unit and an adjacent-position picture block associated with the coding unit.

FIG. 8 is a schematic diagram of an example coding unit (CU) and an adjacent-position picture block associated with the coding unit according to an embodiment. FIG. 8 is a schematic diagram for illustrating a CU 250 and schematic candidate predicted motion vector positions 252A to 252E associated with the CU 250. Herein, the candidate predicted motion vector positions 252A to 252E may be collectively referred to as a candidate predicted motion vector position 252. The candidate predicted motion vector position 252 represents a spatial candidate predicted motion vector that is in a same picture as the CU 250. The candidate predicted motion vector position 252A is located on the left of the CU 250. The candidate predicted motion vector position 252B is located above the CU 250. The candidate predicted motion vector position 252C is located on the upper right of the CU 250. The candidate predicted motion vector position 252D is located on the lower left of the CU 250. The candidate predicted motion vector position 252E is located on the upper left of the CU 250. FIG. 8 shows a schematic implementation of a manner in which an inter prediction module 121 and a motion compensation module 162 may generate candidate predicted motion vector lists. In the following, the embodiment is explained with reference to the inter prediction module 121. However, it should be understood that the motion compensation module 162 may implement a same technology, and therefore generate a same candidate predicted motion vector list. In this embodiment, a picture block in which a candidate predicted motion vector position is located is referred to as a reference block. In addition, the reference block includes a spatial reference block, for example, picture blocks in which 252A to 252E are located, and also includes a temporal reference block, for example, a picture block in which a co-located block is located, or a spatially adjacent picture block of a co-located block.

Figure 9:
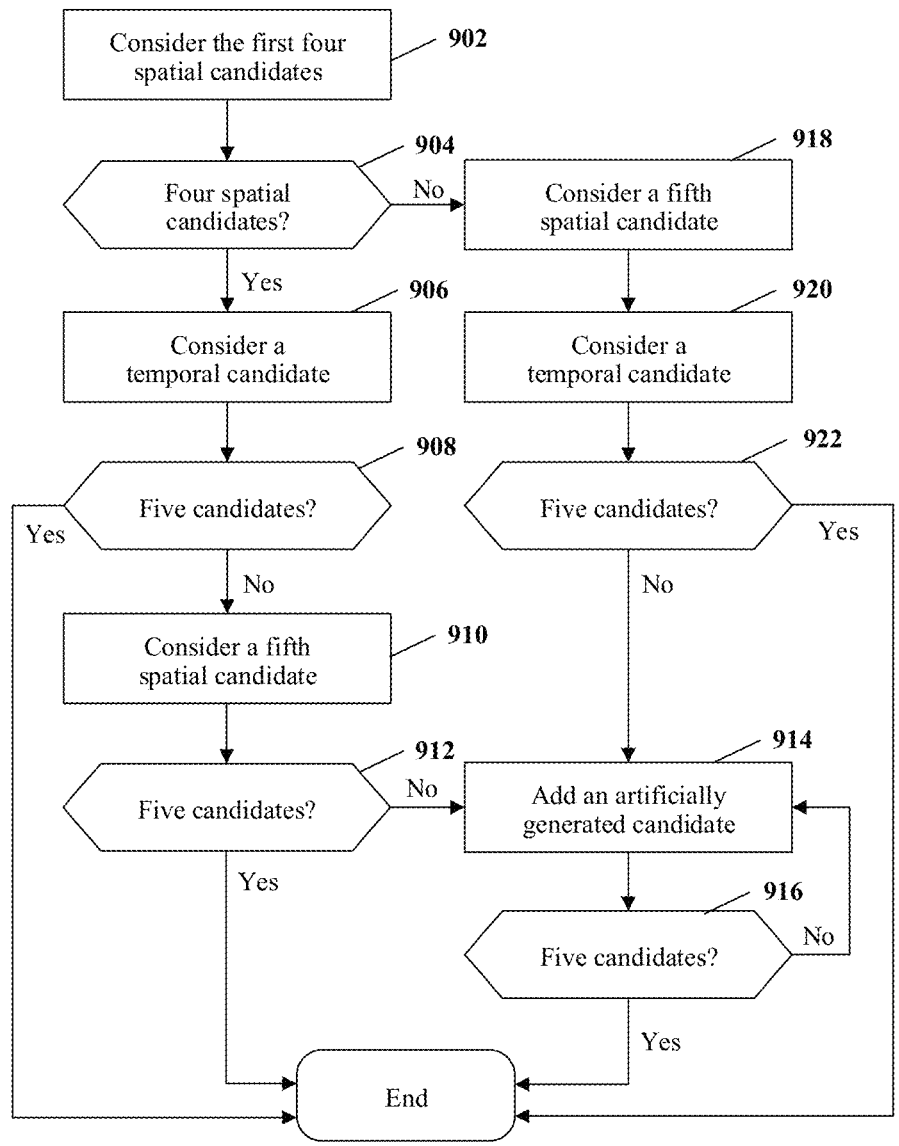
FIG. 9 is a flowchart of an example process of constructing a candidate predicted motion vector list.

FIG. 9 is a flowchart of an example process of constructing a candidate predicted motion vector list according to an embodiment of this application. Aspects in FIG. 9 are described based on a list including five candidate predicted motion vectors, but aspects described herein may alternatively be used with a list of another size. The five candidate predicted motion vectors each may have an index (for example, 0 to 4). Aspects in FIG. 9 are described based on a general video decoder. The general video decoder may be, for example, a video encoder (for example, the video encoder 20) or a video decoder (for example, the video decoder 30).

To reconstruct a candidate predicted motion vector list according to an embodiment of FIG. 9, the video decoder first considers four spatial candidate predicted motion vectors (902). The four spatial candidate predicted motion vectors may include candidate predicted motion vector positions 252A, 252B, 252 C, and 252D. The four spatial candidate predicted motion vectors may correspond to motion information for four PUs that are located in a same picture as a current CU (for example, a CU 250). The video decoder may consider the four spatial candidate predicted motion vectors in the list in a specified order. For example, the candidate predicted motion vector position 252A may be first considered. If the candidate predicted motion vector position 252A is available, the candidate predicted motion vector position 252A may be assigned to an index 0. If the candidate predicted motion vector position 252A is unavailable, the video decoder may not add the candidate predicted motion vector position 252A to the candidate predicted motion vector list. A candidate predicted motion vector position may be unavailable for various reasons. For example, if the candidate predicted motion vector position is not located within a current picture, the candidate predicted motion vector position may be unavailable. In another embodiment, if the candidate predicted motion vector position undergoes intra prediction, the candidate predicted motion vector position may be unavailable. In another embodiment, if the candidate predicted motion vector position is located in a slice different from that of the current CU, the candidate predicted motion vector position may be unavailable.

After considering the candidate predicted motion vector position 252A, the video decoder may consider the candidate predicted motion vector position 252B. If the candidate predicted motion vector position 252B is available and different from the candidate predicted motion vector position 252A, the video decoder may add the candidate predicted motion vector position 252B to the candidate predicted motion vector list. In this specific context, the term "same" or "different" means that motion information associated with candidate predicted motion vector positions is the same or different. Therefore, if two candidate predicted motion vector positions have same motion information, the two candidate predicted motion vector positions are considered to be the same; or if two candidate predicted motion vector positions have different motion information, the two candidate predicted motion vector positions are considered to be different. If the candidate predicted motion vector position 252A is unavailable, the video decoder may assign the candidate predicted motion vector position 252B to the index 0. If the candidate predicted motion vector position 252A is available, the video decoder may assign the candidate predicted motion vector position 252 to an index 1. If the candidate predicted motion vector position 252B is unavailable or is the same as the candidate predicted motion vector position 252A, the video decoder skips adding the candidate predicted motion vector position 252B to the candidate predicted motion vector list.

Similarly, the video decoder considers the candidate predicted motion vector position 252C to determine whether to add the candidate predicted motion vector position 252C to the list. If the candidate predicted motion vector position 252C is available and different from the candidate predicted motion vector positions 252B and 252A, the video decoder may assign the candidate predicted motion vector position 252C to a next available index. If the candidate predicted motion vector position 252C is unavailable or is the same as at least one of the candidate predicted motion vector positions 252A and 252B, the video decoder does not add the candidate predicted motion vector position 252C to the candidate predicted motion vector list. Next, the video decoder considers the candidate predicted motion vector position 252D. If the candidate predicted motion vector position 252D is available and different from the candidate predicted motion vector positions 252A, 252B, and 252C, the video decoder may assign the candidate predicted motion vector position 252D to a next available index. If the candidate predicted motion vector position 252D is unavailable or is the same as at least one of the candidate predicted motion vector positions 252A, 252B, and 252C, the video decoder does not add the candidate predicted motion vector position 252D to the candidate predicted motion vector list. In the foregoing embodiment, an example in which the candidate predicted motion vector positions 252A to 252D are considered to determine whether to be included in the candidate predicted motion vector list is generally described. However, in some embodiments, all the candidate predicted motion vector positions 252A to 252D may be first added to the candidate predicted motion vector list, and then a repeated candidate predicted motion vector position is removed from the candidate predicted motion vector list.

After the video decoder considers the first four spatial candidate predicted motion vectors, the candidate predicted motion vector list may include four spatial candidate predicted motion vectors, or the list may include less than four spatial candidate predicted motion vectors. If the list includes four spatial candidate predicted motion vectors (904, yes), the video decoder considers a temporal candidate predicted motion vector (906). The temporal candidate predicted motion vector may correspond to motion information for a co-located PU of a picture different from the current picture. If the temporal candidate predicted motion vector is available and different from the first four spatial candidate predicted motion vectors, the video decoder assigns the temporal candidate predicted motion vector to an index 4. If the temporal candidate predicted motion vector is unavailable or is the same as one of the first four spatial candidate predicted motion vectors, the video decoder does not add the temporal candidate predicted motion vector to the candidate predicted motion vector list. Therefore, after the video decoder considers the temporal candidate predicted motion vector (906), the candidate predicted motion vector list may include five candidate predicted motion vectors (the first four spatial candidate predicted motion vectors considered in 902 and the temporal candidate predicted motion vector considered in 906) or may include four candidate predicted motion vectors (the first four spatial candidate predicted motion vectors considered in 902). If the candidate predicted motion vector list includes five candidate predicted motion vectors (908, yes), the video decoder completes constructing the list.

If the candidate predicted motion vector list includes four candidate predicted motion vectors (908, no), the video decoder may consider a fifth spatial candidate predicted motion vector (910). The fifth spatial candidate predicted motion vector may, for example, correspond to a candidate predicted motion vector position 252E. If the candidate predicted motion vector at the position 252E is available and different from the candidate predicted motion vectors at the positions 252A, 252B, 252C, and 252D, the video decoder may add the fifth spatial candidate predicted motion vector to the candidate predicted motion vector list, and assign the fifth spatial candidate predicted motion vector to the index 4. If the candidate predicted motion vector at the position 252E is unavailable or is the same as the candidate predicted motion vectors at the candidate predicted motion vector positions 252A, 252B, 252C, and 252D, the video decoder may not add the candidate predicted motion vector at the position 252E to the candidate predicted motion vector list. Therefore, after the fifth spatial candidate predicted motion vector is considered (910), the list may include five candidate predicted motion vectors (the first four spatial candidate predicted motion vectors considered in 902 and the fifth spatial candidate predicted motion vector considered in 910) or may include four candidate predicted motion vectors (the first four spatial candidate predicted motion vectors considered in 902).

If the candidate predicted motion vector list includes five candidate predicted motion vectors (912, yes), the video decoder completes generating the candidate predicted motion vector list. If the candidate predicted motion vector list includes four candidate predicted motion vectors (912, no), the video decoder adds an artificially generated candidate predicted motion vector (914) until the list includes five candidate predicted motion vectors (916, yes).

If the list includes less than four spatial candidate predicted motion vectors (904, no) after the video decoder considers the first four spatial candidate predicted motion vectors, the video decoder may consider a fifth spatial candidate predicted motion vector (918). The fifth spatial candidate predicted motion vector may (for example) correspond to a candidate predicted motion vector position 252E. If the candidate predicted motion vector at the position 252E is available and different from the existing candidate predicted motion vectors in the candidate predicted motion vector list, the video decoder may add the fifth spatial candidate predicted motion vector to the candidate predicted motion vector list, and assign the fifth spatial candidate predicted motion vector to a next available index. If the candidate predicted motion vector at the position 252E is unavailable or is the same as one of the existing candidate predicted motion vectors in the candidate predicted motion vector list, the video decoder may not add the candidate predicted motion vector at the position 252E to the candidate predicted motion vector list. Next, the video decoder may consider a temporal candidate predicted motion vector (920). If the temporal candidate predicted motion vector is available and different from the existing candidate predicted motion vectors in the candidate predicted motion vector list, the video decoder may add the temporal candidate predicted motion vector to the candidate predicted motion vector list, and assign the temporal candidate predicted motion vector to a next available index. If the temporal candidate predicted motion vector is unavailable or is the same as one of the existing candidate predicted motion vectors in the candidate predicted motion vector list, the video decoder may not add the temporal candidate predicted motion vector to the candidate predicted motion vector list.

If the candidate predicted motion vector list includes five candidate predicted motion vectors (922, yes) after the fifth spatial candidate predicted motion vector (in 918) and the temporal candidate predicted motion vector (in 920) are considered, the video decoder completes generating the candidate predicted motion vector list. If the candidate predicted motion vector list includes less than five candidate predicted motion vectors (922, no), the video decoder adds an artificially generated candidate predicted motion vector (914) until the list includes five candidate predicted motion vectors (916, yes).

According to the embodiments described herein, an additional merge candidate predicted motion vector may be artificially generated after a spatial candidate predicted motion vector and a temporal candidate predicted motion vector, so that a size of a merge candidate predicted motion vector list is fixed and equal to a specified quantity (for example, five in the embodiment of FIG. 9 described above) of merge candidate predicted motion vectors. The additional merge candidate predicted motion vector may include examples of a combined bi-predictive merge candidate predicted motion vector (a candidate predicted motion vector 1), a scaled bi-predictive merge candidate predicted motion vector (a candidate predicted motion vector 2), and a zero-vector merge/AMVP candidate predicted motion vector (a candidate predicted motion vector 3).

Figure 10:
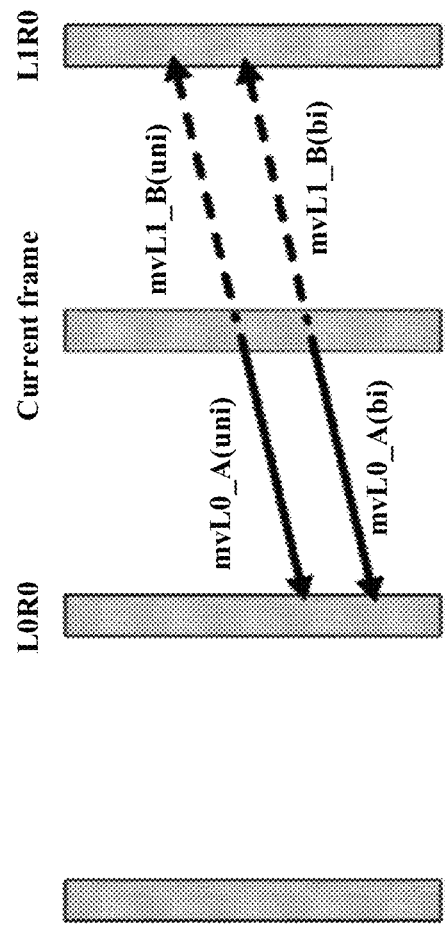
FIG. 10 is a schematic diagram of an example embodiment of adding a combined candidate motion vector to a merge-mode candidate predicted motion vector list.

FIG. 10 is a schematic diagram of an example embodiment of adding a combined candidate motion vector to a merge-mode candidate predicted motion vector list according to an embodiment. A combined bi-predictive merge candidate predicted motion vector may be generated by combining original merge candidate predicted motion vectors. Specifically, two original candidate predicted motion vectors (which have mvL0 and refIdxL0 or mvL1 and refIdxL1) may be used to generate the bi-predictive merge candidate predicted motion vector. In FIG. 10, two candidate predicted motion vectors are included in an original merge candidate predicted motion vector list. A prediction type of one candidate predicted motion vector is unidirectional prediction by using a list 0, and a prediction type of the other candidate predicted motion vector is unidirectional prediction by using a list 1. In this embodiment, mvL0_A and ref0 are taken from the list 0, and mvL1_B and ref0 are taken from the list 1. Then, a bi-predictive merge candidate predicted motion vector (which has mvL0_A and ref0 in the list 0 and mvL1_B and ref0 in the list 1) may be generated, and whether the bi-predictive merge candidate predicted motion vector is different from an existing candidate predicted motion vector in the candidate predicted motion vector list is checked. If the bi-predictive merge candidate predicted motion vector is different from the existing candidate predicted motion vector, a video decoder may add the bi-predictive merge candidate predicted motion vector to the candidate predicted motion vector list.

Figure 11:
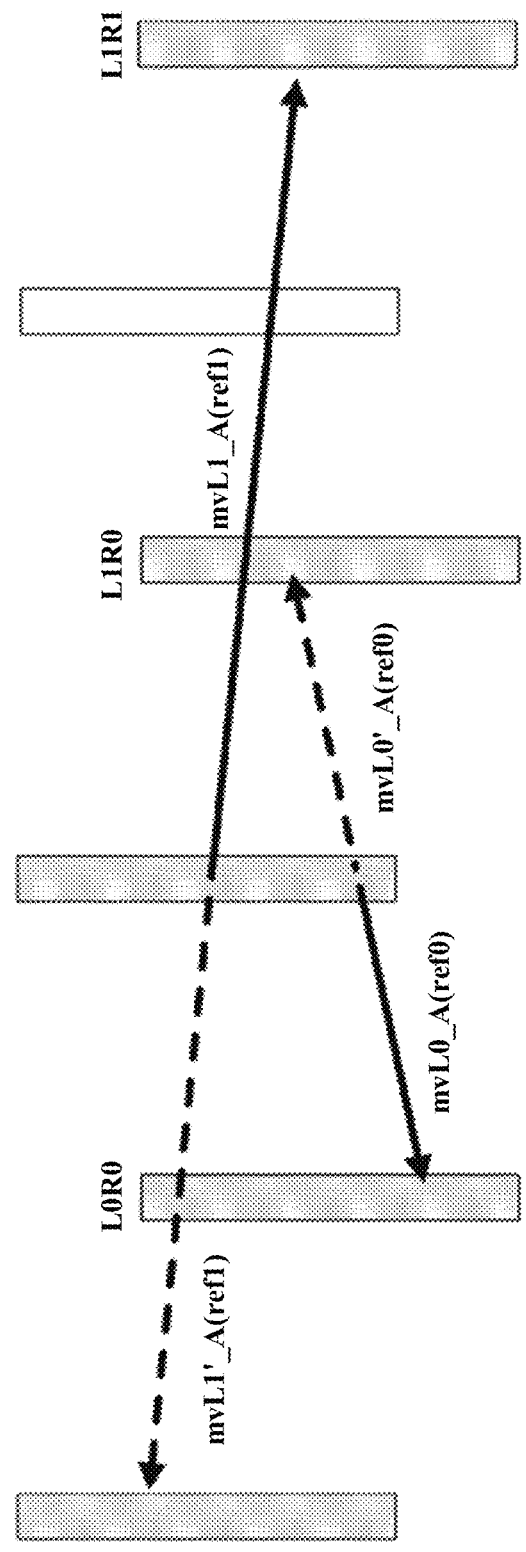
FIG. 11 is a schematic diagram of an example embodiment of adding a scaled candidate motion vector to a merge-mode candidate predicted motion vector list.

FIG. 11 is a schematic diagram of an example embodiment of adding a scaled candidate motion vector to a merge-mode candidate predicted motion vector list according to an embodiment. A scaled bi-predictive merge candidate predicted motion vector may be generated by scaling an original merge candidate predicted motion vector. Specifically, one original candidate predicted motion vector (which has mvLX and refIdxLX) may be used to generate the bi-predictive merge candidate predicted motion vector. In an embodiment of FIG. 11, two candidate predicted motion vectors are included in an original merge candidate predicted motion vector list. A prediction type of one candidate predicted motion vector is unidirectional prediction by using a list 0, and a prediction type of the other candidate predicted motion vector is unidirectional prediction by using a list 1. In this embodiment, mvL0_A and ref0 may be taken from the list 0, and ref0 may be copied to the list 1 and is denoted as a reference index ref0'. Next, mvL0'_A may be calculated by scaling mvL0_A with ref0 and ref0'. Scaling may depend on a POC (Picture Order Count) distance. Next, a bi-predictive merge candidate predicted motion vector (which has mvL0_A and ref0 in the list 0 and mvL0'_A and ref0' in the list 1) may be generated, and whether the bi-predictive merge candidate predicted motion vector is repeated is checked. If the bi-predictive merge candidate predicted motion vector is not repeated, it may be added to the merge candidate predicted motion vector list.

Figure 12:
FIG. 12 is a schematic diagram of an example embodiment of adding a zero motion vector to a merge-mode candidate predicted motion vector list.

FIG. 12 is a schematic diagram of an example embodiment of adding a zero motion vector to a merge-mode candidate predicted motion vector list according to an embodiment. A zero-vector merge candidate predicted motion vector may be generated by combining a zero vector and a reference index that can be referenced. If the zero-vector merge candidate predicted motion vector is not repeated, it may be added to a merge candidate predicted motion vector list. Motion information of each generated merge candidate predicted motion vector may be compared with motion information of a previous candidate predicted motion vector in the list.

In an embodiment, if a newly generated candidate predicted motion vector is different from an existing candidate predicted motion vector in the candidate predicted motion vector list, the generated candidate predicted motion vector is added to the merge candidate predicted motion vector list. A process of determining whether the candidate predicted motion vector is different from the existing candidate predicted motion vector in the candidate predicted motion vector list is sometimes referred to as pruning. Through pruning, each newly generated candidate predicted motion vector may be compared with the existing candidate predicted motion vector in the list. In some embodiments, the pruning operation may include: comparing one or more new candidate predicted motion vectors with the existing candidate predicted motion vector in the candidate predicted motion vector list, and skipping adding a new candidate predicted motion vector that is the same as the existing candidate predicted motion vector in the candidate predicted motion vector list. In other embodiments, the pruning operation may include: adding one or more new candidate predicted motion vectors to the candidate predicted motion vector list, and then removing a repeated candidate predicted motion vector from the list.

In an embodiment, during inter prediction, a method for predicting motion information of a to-be-processed picture block includes: obtaining motion information of at least one picture block whose motion vector is determined in a picture in which a to-be-processed picture block is located, where the at least one picture block whose motion vector is determined includes a picture block that is not adjacent to the to-be-processed picture block and whose motion vector is determined; obtaining first identification information, where the first identification information is used to determine target motion information in the motion information of the at least one picture block whose motion vector is determined; and predicating motion information of the to-be-processed picture block based on the target motion information.

Figure 13:
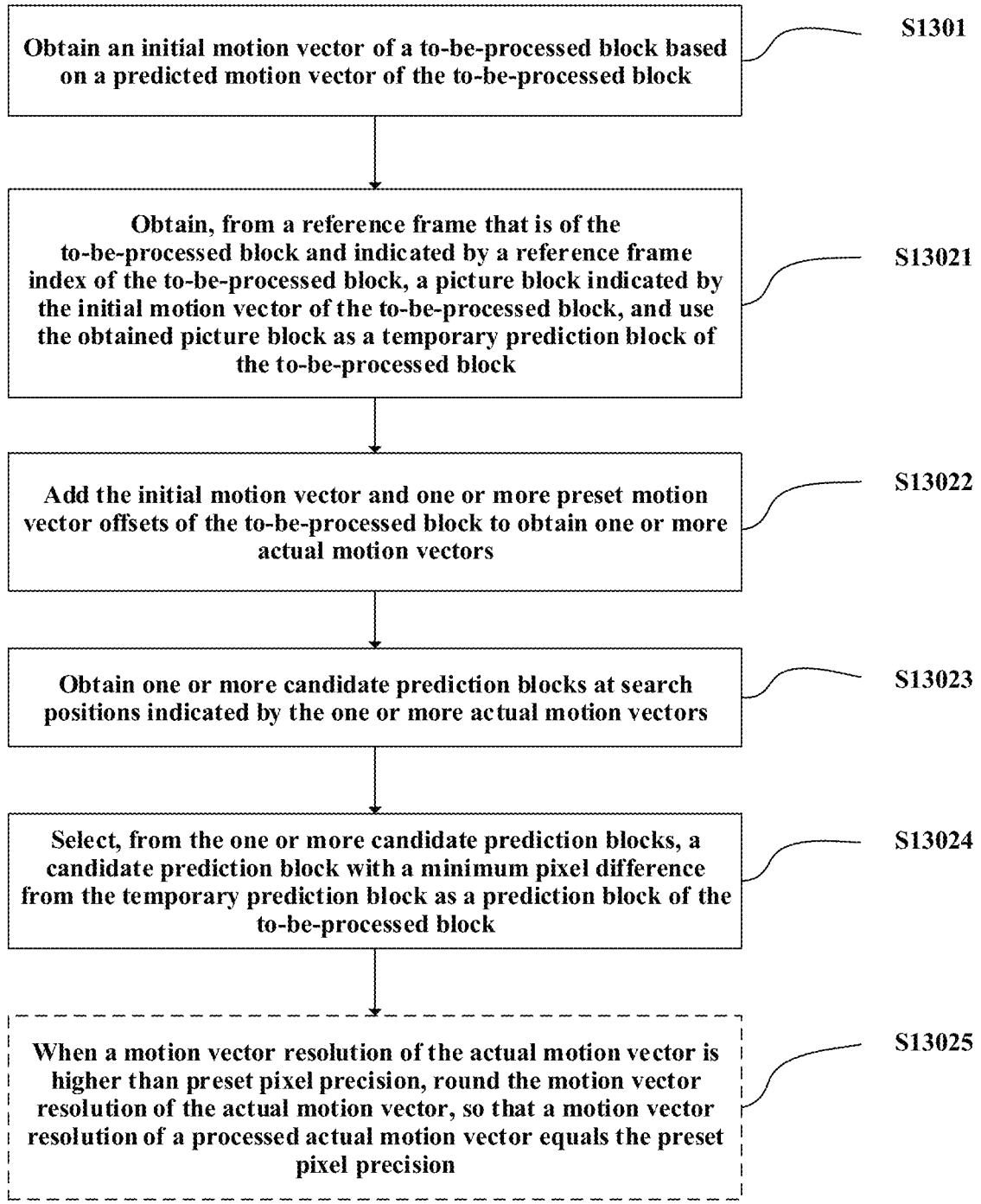
FIG. 13 is a schematic flowchart of a method for updating a motion vector in video encoding according to an embodiment.

FIG. 13 is a flowchart of an example method of updating a motion vector in video encoding according to an embodiment.

S1301: Obtain an initial motion vector of a to-be-processed block based on a predicted motion vector of the to-be-processed block. The to-be-processed block can be a to-be-encoded block.

In an embodiment, for example, in a merge mode, the predicted motion vector of the to-be-processed block is used as the initial motion vector of the to-be-processed block.

In another embodiment, for example, in an AMVP mode, the predicted motion vector of the to-be-processed block and a motion vector difference of the to-be-processed block are added to obtain the initial motion vector of the to-be-processed block.

The predicted motion vector of the to-be-processed block may be obtained according to the methods shown in FIG. 9 to FIG. 12 in the embodiments described herein or any one of existing methods for obtaining a predicted motion vector in the H.265 standard or a JEM reference mode. This is not limited. The motion vector difference may be obtained by using the to-be-processed block as a reference, performing motion estimation within a search range determined based on the predicted motion vector of the to-be-processed block, and calculating a difference between a motion vector, obtained after motion estimation, of the to-be-processed block and the predicted motion vector of the to-be-processed block.

During bidirectional prediction, this step includes: obtaining a forward initial motion vector of the to-be-processed block based on a forward predicted motion vector of the to-be-processed block, and obtaining a backward initial motion vector of the to-be-processed block based on a backward predicted motion vector of the to-be-processed block.

S1302 (not shown): Obtain a prediction block of the to-be-processed block based on the initial motion vector and one or more preset motion vector offsets. For example:

S13021: Obtain, from a reference frame that is of the to-be-processed block and indicated by a reference frame index of the to-be-processed block, a picture block indicated by the initial motion vector of the to-be-processed block, and use the obtained picture block as a temporary prediction block of the to-be-processed block.

S13022: Add the initial motion vector and the one or more preset motion vector offsets of the to-be-processed block to obtain one or more actual motion vectors, where each actual motion vector indicates a search position.

S13023: Obtain one or more candidate prediction blocks at search positions indicated by the one or more actual motion vectors, where each search position corresponds to one candidate prediction block.

S13024: Select, from the one or more candidate prediction blocks, a candidate prediction block with a minimum pixel difference from the temporary prediction block as the prediction block of the to-be-processed block.

It should be understood that the pixel difference may be calculated in a number of manners. For example, a sum of absolute errors between pixel matrices of the candidate prediction block and the temporary prediction block may be calculated, or a mean square error between the pixel matrices may be calculated, or a correlation between the pixel matrices may be calculated. This is not limited.

During bidirectional prediction, this step includes: obtaining, from a forward reference frame that is of the to-be-processed block and indicated by a forward reference frame index of the to-be-processed block, a first picture block indicated by the forward initial motion vector of the to-be-processed block, obtaining, from a backward reference frame that is of the to-be-processed block and indicated by a backward reference frame index of the to-be-processed block, a second picture block indicated by the backward initial motion vector of the to-be-processed block, and weighting the first picture block and the second picture block to obtain the temporary prediction block of the to-be-processed block; adding the forward initial motion vector and the one or more preset motion vector offsets of the to-be-processed block to obtain one or more forward actual motion vectors, and adding the backward initial motion vector and the one or more preset motion vector offsets of the to-be-processed block to obtain one or more backward actual motion vectors; obtaining one or more forward candidate prediction blocks at search positions indicated by the one or more forward actual motion vectors, and obtaining one or more backward candidate prediction blocks at search positions indicated by the one or more backward actual motion vectors; and selecting, from the one or more forward candidate prediction blocks, a candidate prediction block with a minimum pixel difference from the temporary prediction block as a forward prediction block of the to-be-processed block, selecting, from the one or more backward candidate prediction blocks, a candidate prediction block with a minimum pixel difference from the temporary prediction block as a backward prediction block of the to-be-processed block, and weighting the forward prediction block and the backward prediction block to obtain the prediction block of the to-be-processed block.

In an embodiment, after the step S13022, the method further includes:

S13025: When a motion vector resolution of the actual motion vector is higher than preset pixel precision, round the motion vector resolution of the actual motion vector, so that a motion vector resolution of a processed actual motion vector equals the preset pixel precision. The preset pixel precision is integer pixel precision, ½ pixel precision, ¼ pixel precision, or ⅛ pixel precision, and this is not limited.

It should be understood that the motion vector resolution is pixel precision that can be distinguished by a motion vector in a motion estimation or motion compensation process. The rounding may include rounding off, rounding up, rounding down, or the like based on a type of pixel precision. This is not limited.

For example, the rounding may include the following operations:

A horizontal component or a vertical component of a to-be-processed motion vector is decomposed into an integer part a, a decimal part b, and a sign bit. Apparently, a is a non-negative integer, b is a fraction greater than 0 and less than 1, and the sign bit is positive or negative.

It may be assumed that the preset pixel precision is N pixel precision, where N is greater than 0 and less than or equal to 1, and c is equal to b divided by N.

When a rounding-off rule is used, a decimal part of c is rounded off; when a rounding-up rule is used, an integer part of c is increased by 1, and the decimal part is discarded; when a rounding-down rule is used, the decimal part of c is discarded. It may be assumed that c obtained after processing is d.

An absolute value of a processed motion vector component is obtained by multiplying d by N and then adding a, and a positive or negative sign of the motion vector component remains unchanged.

For example, for an actual motion vector (1.25, 1), when the preset pixel precision is the integer pixel precision, the actual motion vector is rounded to obtain (1, 1). For an actual motion vector (−1.7, −1), when the preset pixel precision is the ¼ pixel precision, the actual motion vector is rounded to obtain (−1.75, −1).

In an embodiment, the step S13024 includes: selecting, from the one or more candidate prediction blocks, an actual motion vector corresponding to the candidate prediction block with the minimum pixel difference from the temporary prediction block; when a motion vector resolution of the selected actual motion vector is higher than preset pixel precision, rounding the motion vector resolution of the selected actual motion vector, so that a motion vector resolution of a processed selected actual motion vector equals the preset pixel precision; and determining that a prediction block corresponding to a position indicated by the processed selected actual motion vector is the prediction block of the to-be-processed block.

Likewise, the preset pixel precision is integer pixel precision, ½ pixel precision, ¼ pixel precision, or ⅛ pixel precision. This is not limited. For the rounding, refer to the example in the foregoing embodiment. Details are not described again.

It should be understood that higher pixel precision generally means that more complex pixel interpolation needs to be performed in a search region in the motion estimation or motion compensation process, to make the motion vector resolution equal the preset pixel precision. This can reduce complexity.

Figure 14:
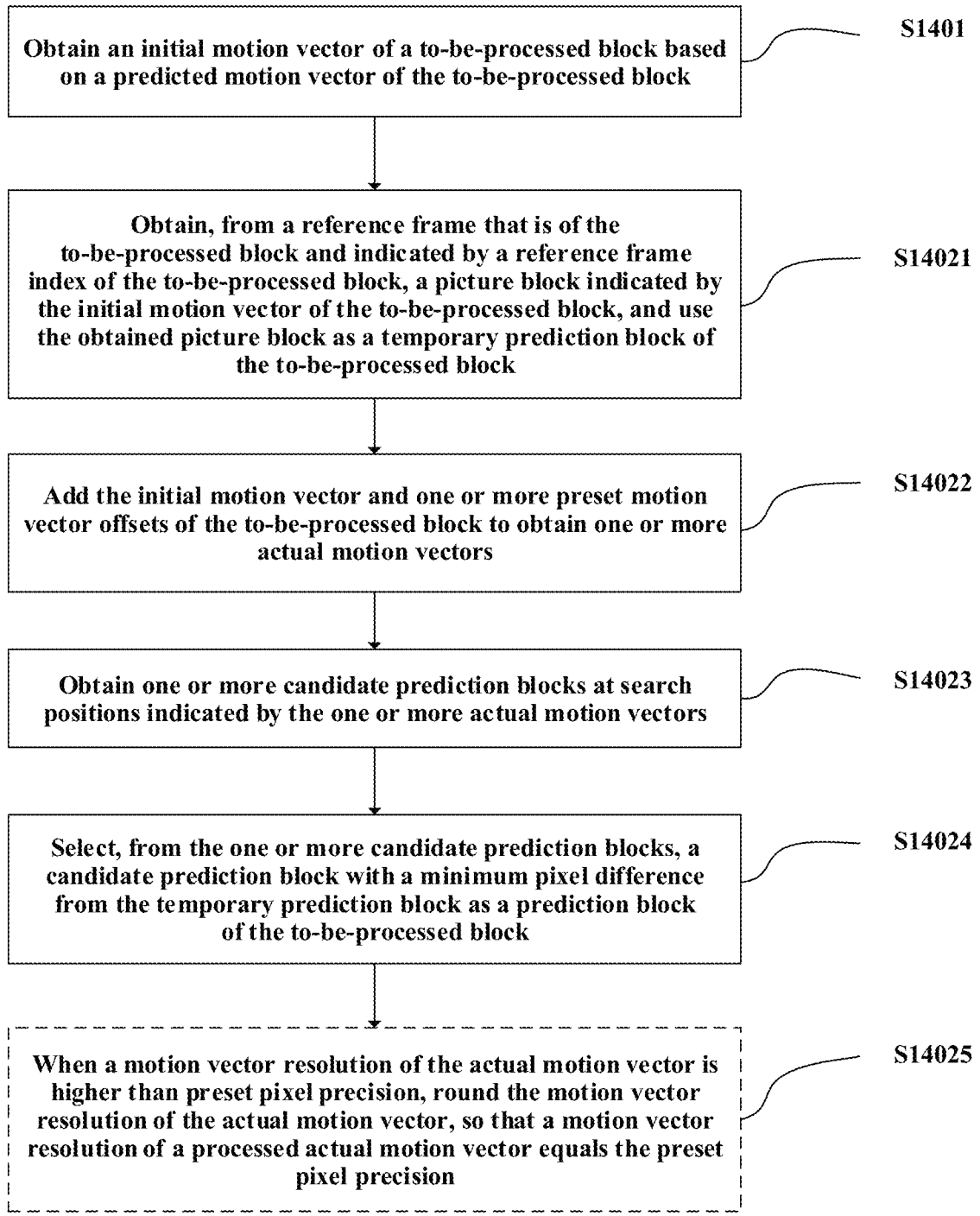
FIG. 14 is a schematic flowchart of a method for updating a motion vector in video decoding according to an embodiment.

FIG. 14 is a flowchart of an example method of updating a motion vector in video decoding according to an embodiment.

S1401: Obtain an initial motion vector of a to-be-processed block based on a predicted motion vector of the to-be-processed block. The to-be-processed block can be a to-be-decoded block.

In an embodiment, for example, in a merge mode, the predicted motion vector of the to-be-processed block is used as the initial motion vector of the to-be-processed block.

In another embodiment, for example, in an AMVP mode, the predicted motion vector of the to-be-processed block and a motion vector difference of the to-be-processed block are added to obtain the initial motion vector of the to-be-processed block.

The predicted motion vector of the to-be-processed block may be obtained according to the methods shown in FIG. 9 to FIG. 12 in the embodiments described herein or any one of existing methods for obtaining a predicted motion vector in the H.265 standard or a JEM reference mode. This is not limited. The motion vector difference may be obtained by parsing a bitstream.

During bidirectional prediction, this step includes: obtaining a forward initial motion vector of the to-be-processed block based on a forward predicted motion vector of the to-be-processed block, and obtaining a backward initial motion vector of the to-be-processed block based on a backward predicted motion vector of the to-be-processed block.

S1402 (not shown): Obtain a prediction block of the to-be-processed block based on the initial motion vector and one or more preset motion vector offsets. For example:

S14021: Obtain, from a reference frame that is of the to-be-processed block and indicated by a reference frame index of the to-be-processed block, a picture block indicated by the initial motion vector of the to-be-processed block, and use the obtained picture block as a temporary prediction block of the to-be-processed block.

S14022: Add the initial motion vector and the one or more preset motion vector offsets of the to-be-processed block to obtain one or more actual motion vectors, where each actual motion vector indicates a search position.

S14023: Obtain one or more candidate prediction blocks at search positions indicated by the one or more actual motion vectors, where each search position corresponds to one candidate prediction block.

S14024: Select, from the one or more candidate prediction blocks, a candidate prediction block with a minimum pixel difference from the temporary prediction block as the prediction block of the to-be-processed block.

It should be understood that the pixel difference may be calculated in a plurality of manners. For example, a sum of absolute errors between pixel matrices of the candidate prediction block and the temporary prediction block may be calculated, or a mean square error between the pixel matrices may be calculated, or a correlation between the pixel matrices may be calculated. This is not limited.

During bidirectional prediction, this step includes: obtaining, from a forward reference frame that is of the to-be-processed block and indicated by a forward reference frame index of the to-be-processed block, a first picture block indicated by the forward initial motion vector of the to-be-processed block, obtaining, from a backward reference frame that is of the to-be-processed block and indicated by a backward reference frame index of the to-be-processed block, a second picture block indicated by the backward initial motion vector of the to-be-processed block, and weighting the first picture block and the second picture block to obtain the temporary prediction block of the to-be-processed block; adding the forward initial motion vector and the one or more preset motion vector offsets of the to-be-processed block to obtain one or more forward actual motion vectors, and adding the backward initial motion vector and the one or more preset motion vector offsets of the to-be-processed block to obtain one or more backward actual motion vectors; obtaining one or more forward candidate prediction blocks at search positions indicated by the one or more forward actual motion vectors, and obtaining one or more backward candidate prediction blocks at search positions indicated by the one or more backward actual motion vectors; and selecting, from the one or more forward candidate prediction blocks, a candidate prediction block with a minimum pixel difference from the temporary prediction block as a forward prediction block of the to-be-processed block, selecting, from the one or more backward candidate prediction blocks, a candidate prediction block with a minimum pixel difference from the temporary prediction block as a backward prediction block of the to-be-processed block, and weighting the forward prediction block and the backward prediction block to obtain the prediction block of the to-be-processed block.

In an embodiment, after the step S14022, the method further includes:

S14025: When a motion vector resolution of the actual motion vector is higher than preset pixel precision, round the motion vector resolution of the actual motion vector, so that a motion vector resolution of a processed actual motion vector equals the preset pixel precision. The preset pixel precision is integer pixel precision, ½ pixel precision, ¼ pixel precision, or ⅛ pixel precision, and this is not limited.

In another embodiment, the step S14024 includes: selecting, from the one or more candidate prediction blocks, an actual motion vector corresponding to the candidate prediction block with the minimum pixel difference from the temporary prediction block; when a motion vector resolution of the selected actual motion vector is higher than preset pixel precision, rounding the motion vector resolution of the selected actual motion vector, so that a motion vector resolution of a processed selected actual motion vector equals the preset pixel precision; and determining that a prediction block corresponding to a position indicated by the processed selected actual motion vector is the prediction block of the to-be-processed block.

Likewise, the preset pixel precision is integer pixel precision, ½ pixel precision, ¼ pixel precision, or ⅛ pixel precision. This is not limited. For the rounding, refer to the example in the foregoing embodiment. Details are not described again.

By using several specific embodiments, the following describes in detail an embodiment of updating a motion vector. It should be understood that, as described in the encoding method in FIG. 13 and the decoding method in FIG. 14, updating of a motion vector is consistent on an encoder and a decoder. Therefore, the following embodiments are described only from the encoder or the decoder. It should be understood that when description is provided from the encoder, implementation on the decoder keeps consistent with that on the encoder; when description is provided from the decoder, implementation on the encoder keeps consistent with that on the decoder.

Embodiment 1

Figure 15:
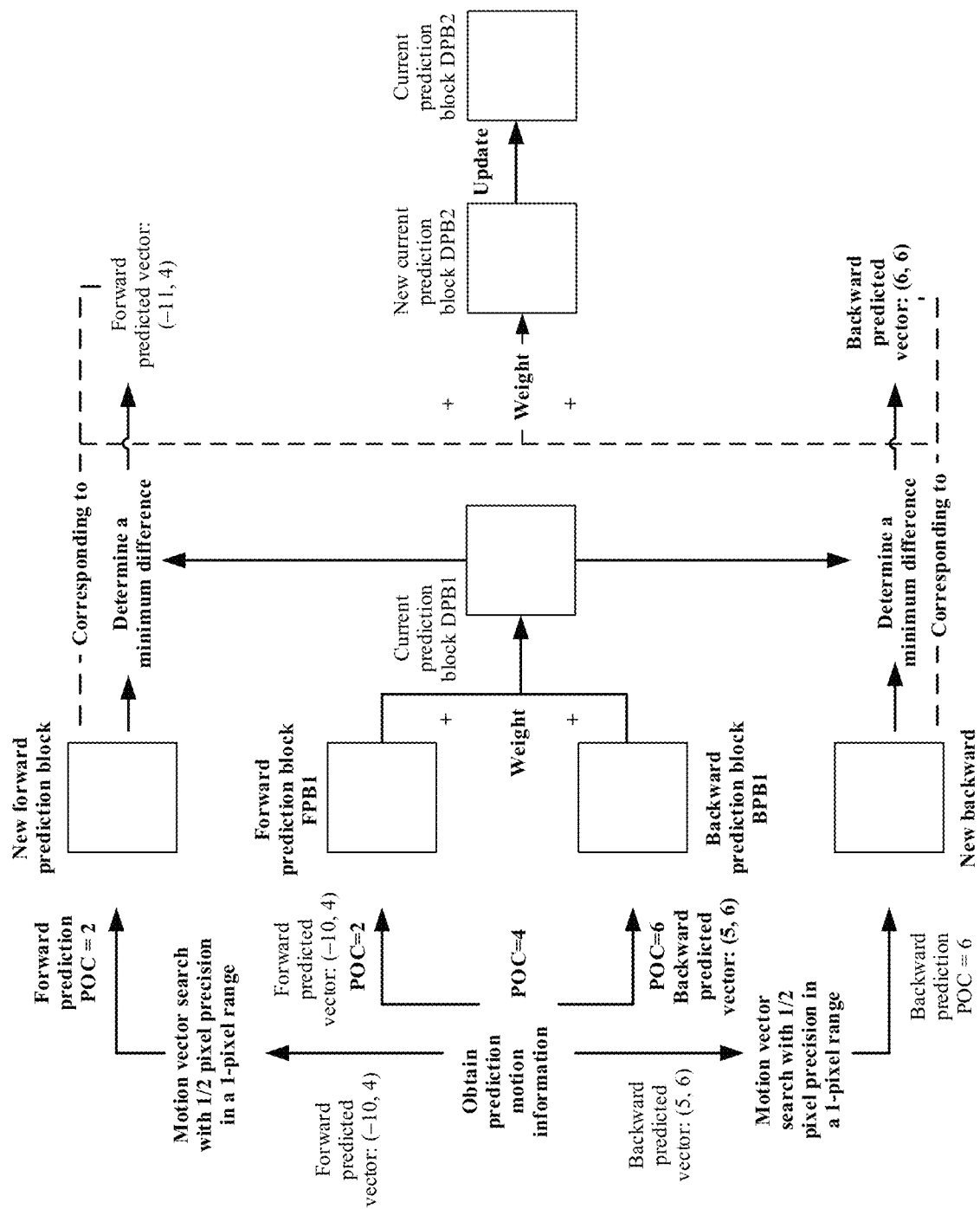
FIG. 15 is a schematic flowchart of updating a motion vector according to an embodiment.

As shown in FIG. 15, a current decoding block is a first decoding block, and prediction motion information of the current decoding block is obtained. It is assumed that forward and backward motion vector predictors of the current decoding block are respectively (−10, 4) and (5, 6), a POC of a picture in which the current decoding block is located is 4, and POCs that are of reference pictures and indicated by index values of the reference pictures are respectively 2 and 6. Therefore, a POC corresponding to the current decoding block is 4, a POC corresponding to a forward prediction reference picture block is 2, and a POC corresponding to a backward prediction reference picture block is 6.

Forward prediction and backward prediction are separately performed on the current decoding block to obtain an initial forward decoding prediction block (or forward prediction block (FPB)) and an initial backward decoding prediction block (or backward prediction block (BPB)) of the current decoding block, and it is assumed that the initial forward decoding prediction block and the initial backward decoding prediction block are respectively FPB1 and BPB1. A first decoding prediction block (DPB) of the current decoding block is obtained by performing weighted summation on FPB1 and BPB1, and is assumed to be DPB1.

(−10, 4) and (5, 6) are used as reference inputs of the forward and backward motion vector predictors, and motion search with first precision is separately performed on the forward prediction reference picture block and the backward prediction reference picture block. In this case, the first precision is ½ pixel precision in a 1-pixel range. The first decoding prediction block DPB1 is used as a reference. Corresponding new forward and backward decoding prediction blocks obtained in each motion search are compared with the first decoding prediction block DPB1, to obtain a new decoding prediction block with a minimum difference from DPB1, and forward and backward motion vector predictors corresponding to the new decoding prediction block are used as target motion vector predictors, and are assumed to be (−11, 4) and (6, 6) respectively.

The target motion vector predictors are updated to (−11, 4) and (6, 6), forward prediction and backward prediction are performed on the first decoding block based on the target motion vector predictors, a target decoding prediction block is obtained by performing weighted summation on obtained new forward and backward decoding prediction blocks, and is assumed to be DPB2, and the decoding prediction block of the current decoding block is updated to DPB2.

It should be noted that, when the motion search with the first precision is performed on the forward prediction reference picture block and the backward prediction reference picture block, the first precision may be any specified precision, for example, may be integer pixel precision, ½ pixel precision, ¼ pixel precision, or ⅛ pixel precision.

Embodiment 2

Figure 16:
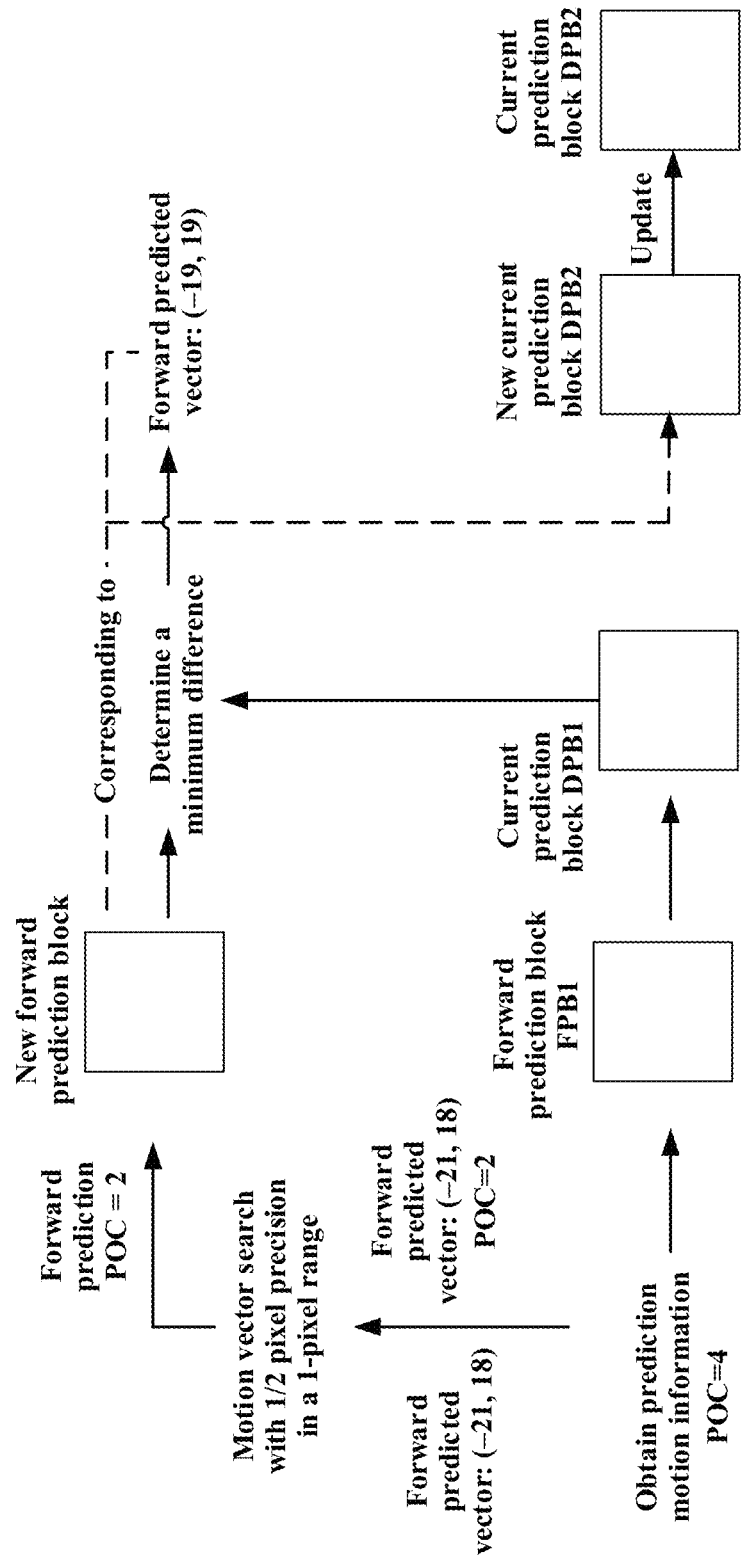
FIG. 16 is a schematic flowchart of updating a motion vector according to an embodiment.

As shown in FIG. 16, a current decoding block is a first decoding block, and prediction motion information of the current decoding block is obtained. It is assumed that a forward motion vector predictor of the current decoding block is (−21, 18), a POC of a picture in which the current decoding block is located is 4, and a POC that is of a reference picture and indicated by an index value of the reference picture is 2. Therefore, a POC corresponding to the current decoding block is 4, and a POC corresponding to a forward prediction reference picture block is 2.

Forward prediction is performed on the current decoding block to obtain an initial forward decoding prediction block of the current decoding block, and it is assumed that the initial forward decoding prediction block is FPB1. In this case, FPB1 is used as a first decoding prediction block of the current decoding block, and the first decoding prediction block is denoted as DPB1.

(−21, 18) is used as a reference input of the forward motion vector predictor, and motion search with first precision is performed on the forward prediction reference picture block. In this case, the first precision is 1-pixel precision in a 5-pixel range. The first decoding prediction block DPB1 is used as a reference. A corresponding new forward decoding prediction block obtained in each motion search is compared with the first decoding prediction block DPB1, to obtain a new decoding prediction block with a minimum difference from DPB1, and a forward motion vector predic-tor corresponding to the new decoding prediction block is used as a target motion vector predictor, and is assumed to be (−19, 19).

The target motion vector predictor is updated to (−19, 19), forward prediction is performed on the first decoding block based on the target motion vector predictor, an obtained new forward decoding prediction block is used as a target decoding prediction block, and is assumed to be DPB2, and the decoding prediction block of the current decoding block is updated to DPB2.

It should be noted that, when the motion search with the first precision is performed on the forward prediction reference picture block and a backward prediction reference picture block, the first precision may be any specified precision, for example, may be integer pixel precision, ½ pixel precision, ¼ pixel precision, or ⅛ pixel precision.

Embodiment 3

Figure 17A:
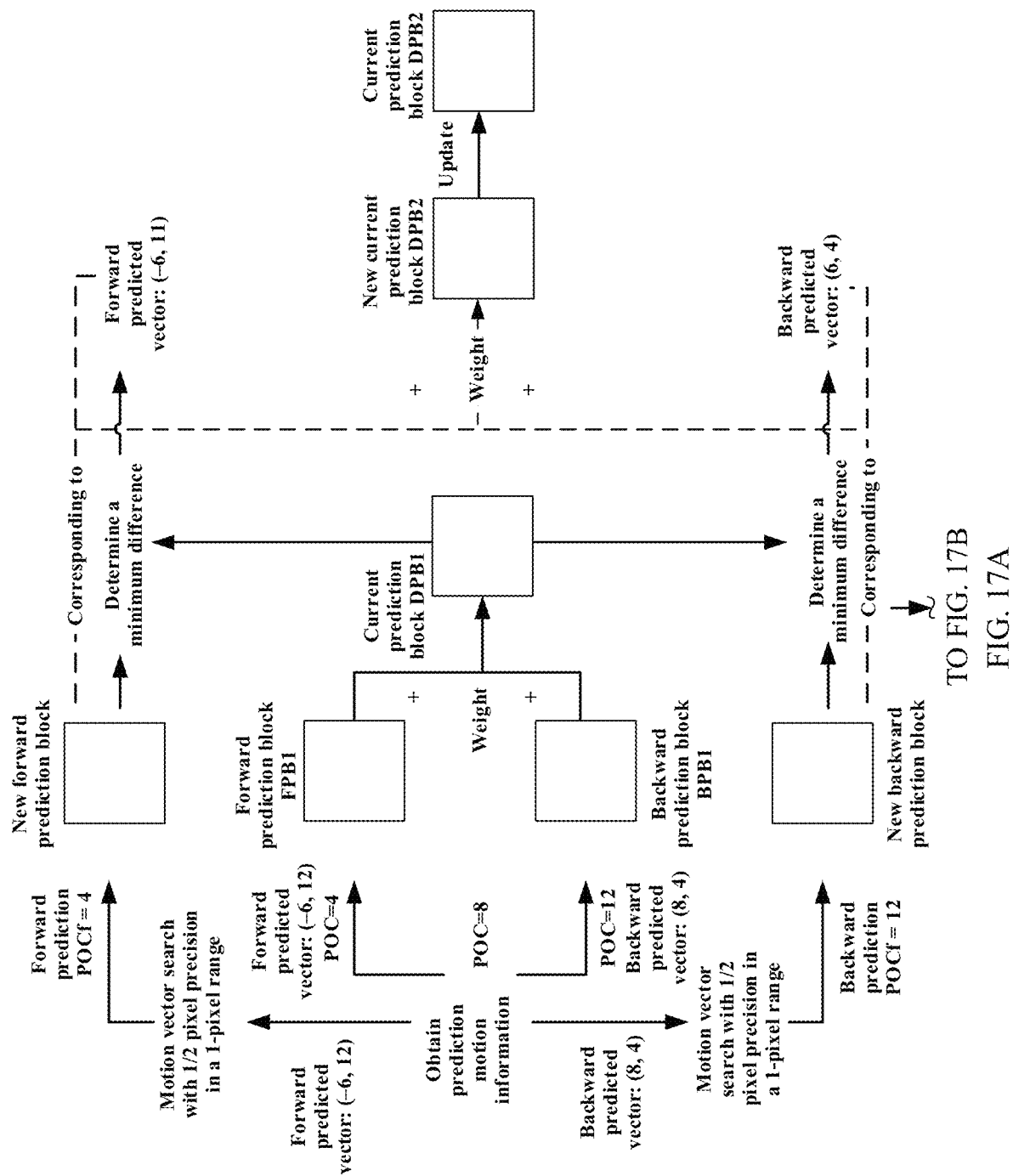
FIG. 17A and FIG. 17B are a schematic flowchart of updating a motion vector according to an embodiment.
Figure 17B:
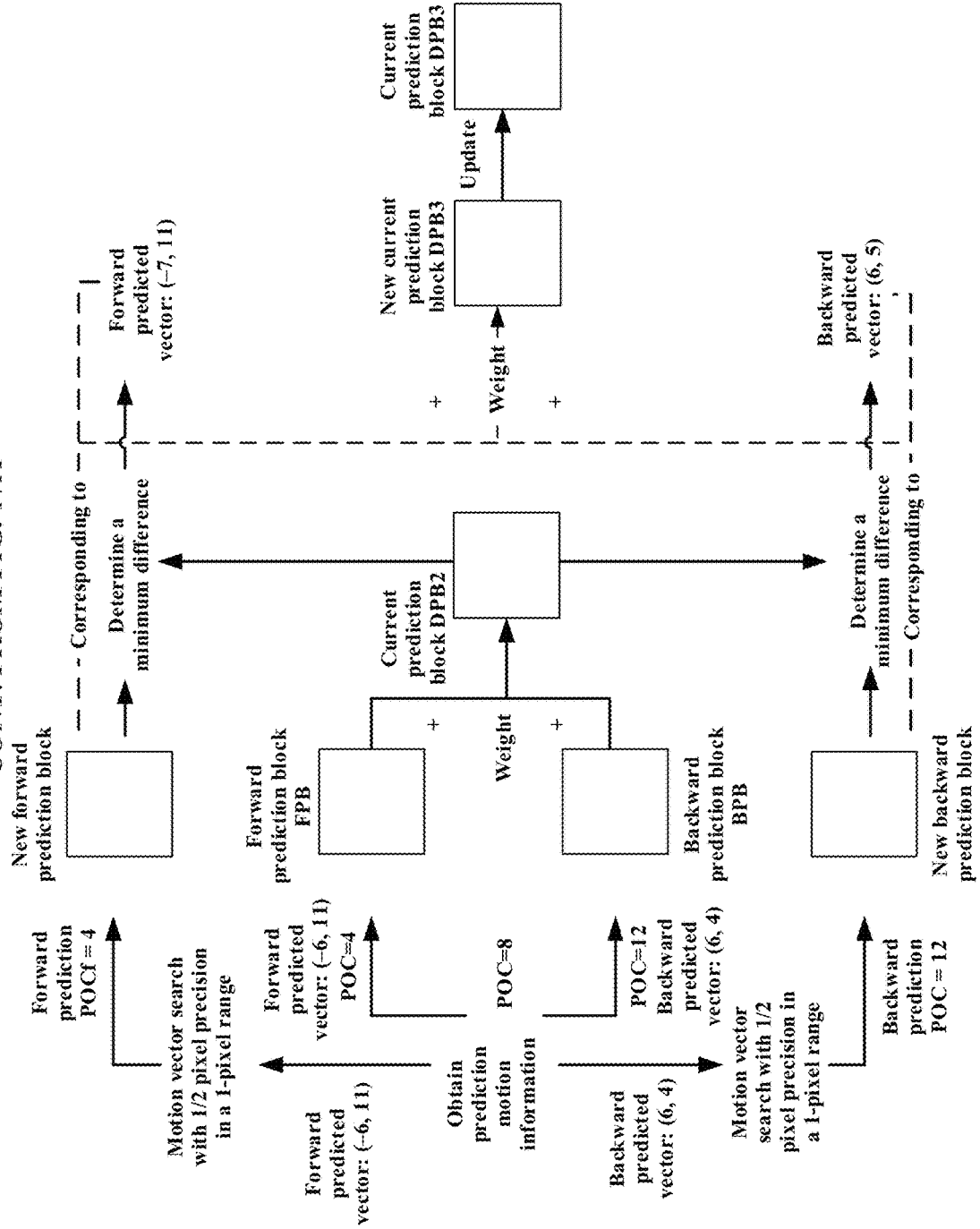

As shown in FIG. 17A and FIG. 17B, a current coding block is a first coding block, and prediction motion information of the current coding block is obtained. It is assumed that forward and backward motion vector predictors of the current coding block are respectively (−6, 12) and (8, 4), a POC of a picture in which the current encoding block is located is 8, and POCs that are of reference pictures and indicated by index values of the reference pictures are respectively 4 and 12. Therefore, a POC corresponding to the current coding block is 4, a POC corresponding to a forward prediction reference picture block is 4, and a POC corresponding to a backward prediction reference picture block is 12.

Forward prediction and backward prediction are separately performed on the current coding block to obtain an initial forward encoding prediction block and an initial backward encoding prediction block of the current coding block, and it is assumed that the initial forward encoding prediction block and the initial backward encoding prediction block are respectively FPB1 and BPB1. A first encoding prediction block of the current coding block is obtained by performing weighted summation on FPB1 and BPB1, and is assumed to be DPB1.

(−6, 12) and (8, 4) are used as reference inputs of the forward and backward motion vector predictors, and motion search with first precision is separately performed on the forward prediction reference picture block and the backward prediction reference picture block. The first encoding pre-diction block DPB1 is used as a reference. Corresponding new forward and backward encoding prediction blocks obtained in each motion search are compared with the first encoding prediction block DPB1, to obtain a new encoding prediction block with a minimum difference from DPB1, and forward and backward motion vector predictors corresponding to the new encoding prediction block are used as target motion vector predictors, and are assumed to be (−11, 4) and (6, 6) respectively.

The target motion vector predictors are updated to (−11, 4) and (6, 6), forward prediction and backward prediction are performed on the first coding block based on the target motion vector predictors, a target encoding prediction block is obtained by performing weighted summation on obtained new forward and backward encoding prediction blocks, and is assumed to be DPB2, and the encoding prediction block of the current coding block is updated to DPB2.

Then, (−11, 4) and (6, 6) are used as reference inputs of the forward and backward motion vector predictors, and the motion search with the first precision is separately performed on the forward prediction reference picture block and the backward prediction reference picture block. The encoding prediction block DPB2 of the current coding block is used as a reference. Corresponding new forward and backward encoding prediction blocks obtained in each motion search are compared with the first encoding prediction block DPB2, to obtain a new encoding prediction block with a minimum difference from DPB2, and forward and backward motion vector predictors corresponding to the new encoding prediction block are used as new target motion vector predictors, and are assumed to be (−7, 11) and (6, 5) respectively.

Then, the target motion vector predictors are updated to (−7, 11) and (6, 5), forward prediction and backward prediction are performed on the first coding block based on the latest target motion vector predictors, a target encoding prediction block is obtained by performing weighted summation on obtained new forward and backward encoding prediction blocks, and is assumed to be DPB3, and the encoding prediction block of the current coding block is updated to DPB3.

Further, the target motion vector predictors may be continuously refined according to the foregoing method, and a quantity of cycles is not limited.

It should be noted that, when the motion search with the first precision is performed on the forward prediction reference picture block and the backward prediction reference picture block, the first precision may be any specified precision, for example, may be integer pixel precision, ½ pixel precision, ¼ pixel precision, or ⅛ pixel precision.

It should be understood that, in some embodiments, the cycle ends when a condition is satisfied. For example, the cycle ends when a difference between DPBn and DPBn−1 is less than a threshold, where n is a positive integer greater than 2.

Embodiment 4

Figure 18:
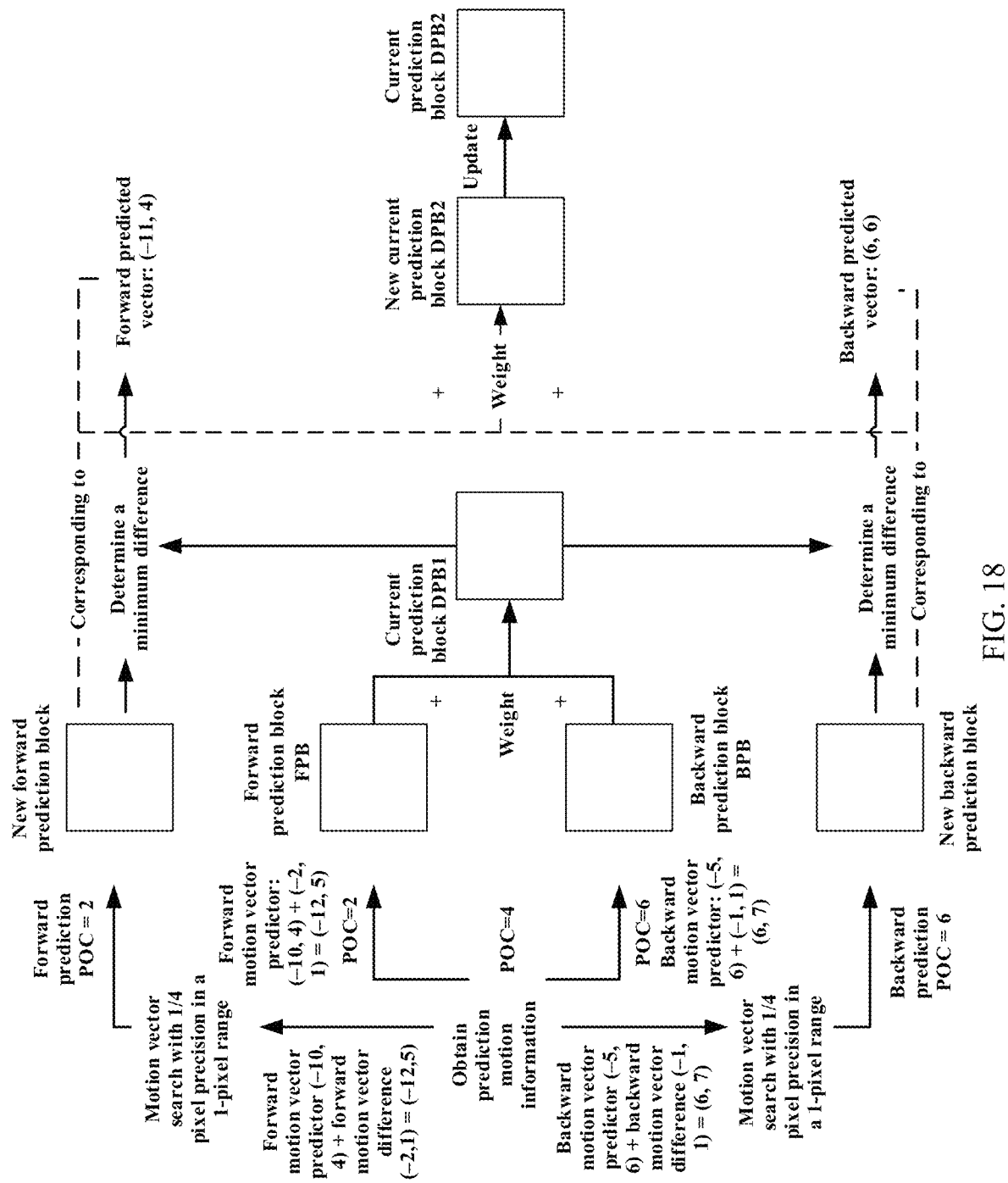
FIG. 18 is a schematic flowchart of updating a motion vector according to an embodiment.

As shown in FIG. 18, a current decoding block is a first decoding block, and prediction motion information of the current decoding block is obtained. It is assumed that forward and backward motion vector prediction values of the current decoding block are respectively (−10, 4) and (5, 6), forward and backward motion vector differences of the current decoding block are (−2, 1) and (1, 1) respectively, a POC of a picture in which the current decoding block is located is 4, and POCs that are of reference pictures and indicated by index values of the reference pictures are respectively 2 and 6. Therefore, a POC corresponding to the current decoding block is 4, a POC corresponding to a forward prediction reference picture block is 2, and a POC corresponding to a backward prediction reference picture block is 6.

Forward prediction and backward prediction are separately performed on the current decoding block to obtain an initial forward decoding prediction block (FPB) and an initial backward decoding prediction block (BPB) of the current decoding block, and it is assumed that the initial forward decoding prediction block and the initial backward decoding prediction block are respectively FPB1 and BPB1. A first decoding prediction block (DPB) of the current decoding block is obtained by performing weighted summation on FPB1 and BPB1, and is assumed to be DPB.

A sum of the forward motion vector predictor and the forward motion vector difference and a sum of the backward motion vector predictor and the backward motion vector difference, namely (−10, 4)+(−2, 1)=(−12, 5) and (5, 6)+(1, 1)=(6, 7), are used a forward motion vector and a backward motion vector respectively, and motion search with first precision is separately performed on the forward prediction reference picture block and the backward prediction reference picture block. In this case, the first precision is ¼ pixel precision in a 1-pixel range. The first decoding prediction block DPB1 is used as a reference. Corresponding new forward and backward decoding prediction blocks obtained in each motion search are compared with the first decoding prediction block DPB1, to obtain a new decoding prediction block with a minimum difference from DPB1, and forward and backward motion vectors corresponding to the new decoding prediction block are used as target motion vector predictors, and are assumed to be (−11, 4) and (6, 6) respectively.

Target motion vectors are updated to (−11, 4) and (6, 6), forward prediction and backward prediction are separately performed on the first decoding block based on the target motion vectors, a target decoding prediction block is obtained by performing weighted summation on obtained new forward and backward decoding prediction blocks, and is assumed to be DPB2, and the decoding prediction block of the current decoding block is updated to DPB2.

Figure 19:
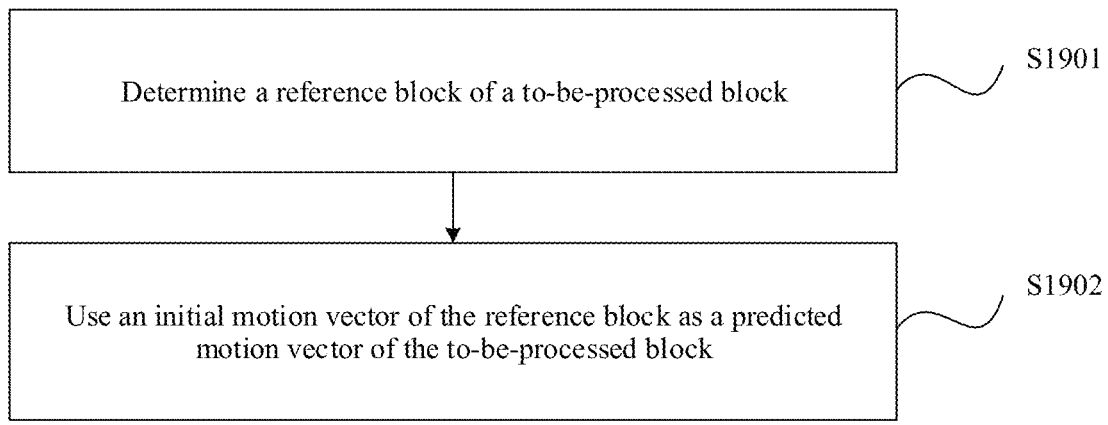
FIG. 19 is a schematic flowchart of a method for obtaining a motion vector in video encoding according to an embodiment.

FIG. 19 is a schematic flowchart of a method for obtaining a motion vector by an encoder according to an embodiment. The method includes the following steps.

S1901: Determine a reference block of a to-be-processed block.

The reference block has been described above with reference to FIG. 8. It should be understood that the reference block not only includes a spatially adjacent block of the to-be-processed block shown in FIG. 8, but also includes another actual or virtual picture block that has a preset temporal or spatial correlation with the to-be-processed block.

It should be understood that beneficial effects of this embodiment are reflected in a scenario in which a motion vector of the reference block of the to-be-processed block is refined. To be specific, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets.

In an embodiment, for a process of updating the motion vector of the reference block and obtaining of the initial motion vector, refer to the embodiment related to FIG. 13 described herein. It should be understood that the reference block in the embodiment related to FIG. 19 is the to-be-processed block in the embodiment related to FIG. 13.

In some embodiments, the determining a reference block of a to-be-processed block includes: selecting, from one or more candidate reference blocks of the to-be-processed block, a candidate reference block with a minimum rate-distortion cost as the reference block of the to-be-processed block.

In some embodiments, after determining the reference block of the to-be-processed block in the one or more candidate reference blocks of the to-be-processed block, the method further includes: encoding identification information of the determined reference block in the one or more candidate reference blocks into a bitstream.

S1902: Use the initial motion vector of the reference block as a predicted motion vector of the to-be-processed block.

In some embodiments, for example, in a merge mode, after the step S1902, the method further includes: using the predicted motion vector of the to-be-processed block as an initial motion vector of the to-be-processed block. Alternatively, in the step S1902, the initial motion vector of the reference block is used as an initial motion vector of the to-be-processed block.

In another embodiment, for example, in an AMVP mode, after the step S1902, the method further includes: adding the predicted motion vector of the to-be-processed block and a motion vector difference of the to-be-processed block to obtain an initial motion vector of the to-be-processed block.

Figure 20:
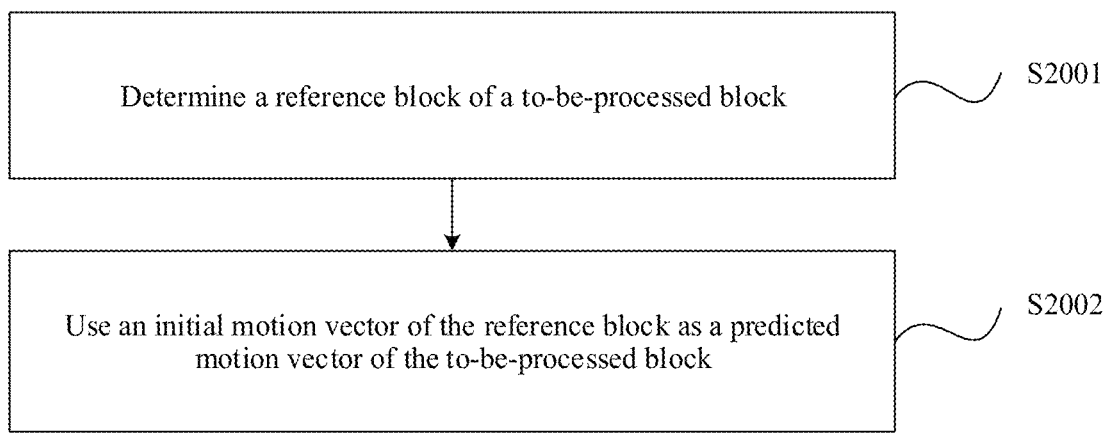
FIG. 20 is a schematic flowchart of a method for obtaining a motion vector in video decoding according to an embodiment.

FIG. 20 is a schematic flowchart of a method for obtaining a motion vector by a decoder according to an embodiment. The method includes the following steps.

S2001: Determine a reference block of a to-be-processed block.

It should be understood that beneficial effects of this embodiment are reflected in a scenario in which a motion vector of the reference block of the to-be-processed block is refined. To be specific, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets.

In an embodiment, for a process of updating the motion vector of the reference block and obtaining of the initial motion vector, refer to the embodiment related to FIG. 14 in this application. It should be understood that the reference block in the embodiment related to FIG. 20 is the to-be-processed block in the embodiment related to FIG. 14.

In some embodiments, the determining a reference block of a to-be-processed block specifically includes: parsing a bitstream to obtain second identification information; and determining the reference block of the to-be-processed block based on the second identification information.

S2002: Use the initial motion vector of the reference block as a predicted motion vector of the to-be-processed block.

In an embodiment, for example, in a merge mode, after the step S2002, the method further includes: using the predicted motion vector of the to-be-processed block as an initial motion vector of the to-be-processed block. Alternatively, in the step S2002, the initial motion vector of the reference block is used as an initial motion vector of the to-be-processed block.

In another embodiment, for example, in an AMVP mode, after the step S2002, the method further includes: adding the predicted motion vector of the to-be-processed block and a motion vector difference of the to-be-processed block to obtain an initial motion vector of the to-be-processed block, where the motion vector difference of the to-be-processed block is obtained by parsing first identification information in the bitstream.

In the foregoing embodiments, an initial motion vector before update is used to replace an actual motion vector, and is used for predicting a subsequent coding block or decoding block. A prediction step may be performed for the subsequent coding block or decoding block before update of the actual motion vector is completed. This ensures encoding efficiency improvement brought by motion vector update, and eliminates the processing delay.

Figure 21:
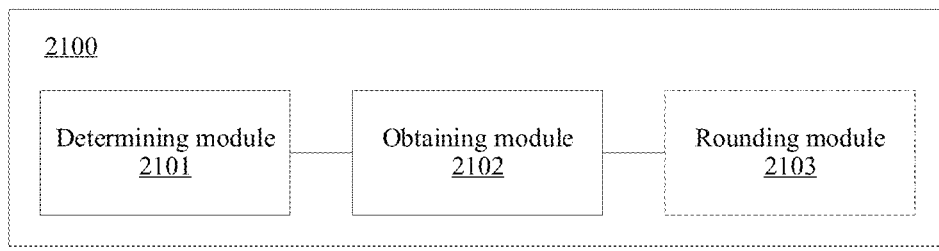
FIG. 21 is a schematic block diagram of an apparatus for obtaining a motion vector in video decoding according to an embodiment.

FIG. 21 is a schematic block diagram of an apparatus for obtaining a motion vector according to an embodiment. In FIG. 21, apparatus 2100 includes:

a determining module 2101, configured to determine a reference block of a to-be-processed block, where the reference block and the to-be-processed block have a preset temporal or spatial correlation, the reference block has an initial motion vector and one or more preset motion vector offsets, the initial motion vector of the reference block is obtained based on a predicted motion vector of the reference block, and a prediction block of the reference block is obtained based on the initial motion vector and the one or more preset motion vector offsets; and an obtaining module 2102, configured to use the initial motion vector of the reference block as a predicted motion vector of the to-be-processed block.

In an embodiment, the obtaining module 2102 is further configured to: use the predicted motion vector of the reference block as the initial motion vector of the reference block; or add the predicted motion vector of the reference block and a motion vector difference of the reference block to obtain the initial motion vector of the reference block.

In an embodiment, the obtaining module 2102 is further configured to: obtain, from a reference frame of the reference block, a picture block indicated by the initial motion vector of the reference block, and use the obtained picture block as a temporary prediction block of the reference block; add the initial motion vector and the one or more preset motion vector offsets of the reference block to obtain one or more actual motion vectors, where each actual motion vector indicates a search position; obtain one or more candidate prediction blocks at search positions indicated by the one or more actual motion vectors, where each search position corresponds to one candidate prediction block; and select, from the one or more candidate prediction blocks, a candidate prediction block with a minimum pixel difference from the temporary prediction block as the prediction block of the reference block.

In an embodiment, the apparatus 2100 is configured for bidirectional prediction, the reference frame includes a first-direction reference frame and a second-direction reference frame, the initial motion vector includes a first-direction initial motion vector and a second-direction initial motion vector, and the obtaining module 2102 is configured to: obtain, from the first-direction reference frame of the reference block, a first picture block indicated by the first-direction initial motion vector of the reference block; obtain, from the second-direction reference frame of the reference block, a second picture block indicated by the second-direction initial motion vector of the reference block; and weight the first picture block and the second picture block to obtain the temporary prediction block of the reference block.

In an embodiment, the apparatus 2100 further includes: a rounding module 2103, configured to: when a motion vector resolution of the actual motion vector is higher than preset pixel precision, round the motion vector resolution of the actual motion vector, so that a motion vector resolution of a processed actual motion vector equals the preset pixel precision.

In an embodiment, the obtaining module 2102 is configured to: select, from the one or more candidate prediction blocks, an actual motion vector corresponding to the candidate prediction block with the minimum pixel difference from the temporary prediction block; when a motion vector resolution of the selected actual motion vector is higher than preset pixel precision, round the motion vector resolution of the selected actual motion vector, so that a motion vector resolution of a processed selected actual motion vector equals the preset pixel precision; and determine that a prediction block corresponding to a position indicated by the processed selected actual motion vector is the prediction block of the reference block.

In an embodiment, the preset pixel precision is integer pixel precision, ½ pixel precision, ¼ pixel precision, or ⅛ pixel precision.

In an embodiment, the obtaining module 2102 is configured to use the predicted motion vector of the to-be-processed block as an initial motion vector of the to-be-processed block.

In an embodiment, the obtaining module 2102 is configured to add the predicted motion vector of the to-be-processed block and a motion vector difference of the to-be-processed block to obtain an initial motion vector of the to-be-processed block.

In an embodiment, the apparatus 2100 is configured for video decoding, and the motion vector difference of the to-be-processed block is obtained by parsing first identification information in a bitstream.

In an embodiment, the apparatus 2100 is configured for video decoding, and the determining module 2101 is configured to: parse a bitstream to obtain second identification information; and determine the reference block of the to-be-processed block based on the second identification information.

In an embodiment, the apparatus 2100 is configured for video encoding, and the determining module 2101 is configured to: select, from one or more candidate reference blocks of the to-be-processed block, a candidate reference block with a minimum rate-distortion cost as the reference block of the to-be-processed block.

Figure 22:
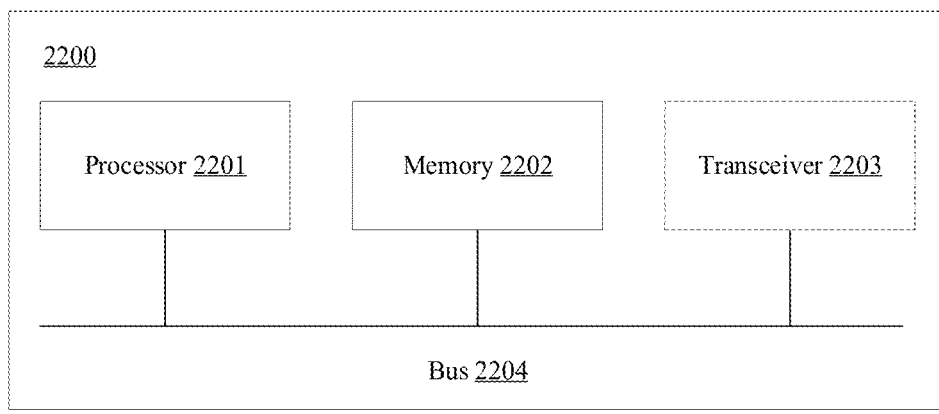
FIG. 22 is a schematic block diagram of a video coding apparatus according to an embodiment.

FIG. 22 is a schematic block diagram of a video coding device according to an embodiment. The device 2200 may be applied to an encoder, or may be applied to a decoder. The device 2200 includes a processor 2201 and a memory 2202. The processor 2201 and the memory 2202 are connected to each other (for example, connected to each other through a bus 2204). In an embodiment, the device 2200 may further include a transceiver 2203. The transceiver 2203 is connected to the processor 2201 and the memory 2202, and is configured to receive/send data.

The memory 2202 includes but is not limited to a random access memory (RAM), a read-only memory (ROM), an erasable programmable read-only memory (EPROM), or a compact disc read-only memory (CD-ROM). The memory 2202 is configured to store related program code and video data.

The processor 2201 may be one or more central processing units (CPU). When the processor 2201 is one CPU, the CPU may be a single-core CPU or a multi-core CPU.

The processor 2201 is configured to read the program code stored in the memory 2202, and perform operations in any embodiment corresponding to FIG. 13 to FIG. 20 and various other embodiments.

For example, an embodiment described herein further provides a computer-readable storage medium. The computer-readable storage medium stores an instruction. When the instruction is run on a computer, the computer is enabled to perform operations in any embodiment corresponding to FIG. 13 to FIG. 20 and various other embodiments.

For example, an embodiment described herein further provides a computer program product including an instruction. When the computer program product runs on a computer, the computer is enabled to perform operations in any embodiment corresponding to FIG. 13 to FIG. 20 and various other embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions, and when the computer program instructions are loaded and executed on a computer, all or some of the procedures or functions according to the embodiments of the present disclosure are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared or microwave) manner. The computer-readable storage medium may be any usable medium accessible by a computer, or may be a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, the description of each embodiment has respective focuses. For a part that is not described in detail in an embodiment, refer to related descriptions in other embodiments.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for obtaining a motion vector, comprising:
determining a reference block of a to-be-processed block, wherein the reference block and the to-be-processed block have a preset spatial correlation, the reference block is obtained based on a prediction block of the reference block determined by a refined initial motion vector, the refined initial motion vector is obtained based on an initial motion vector and one or more preset motion vector offsets, and the initial motion vector is obtained based on a predicted motion vector of the reference block; and using the initial motion vector as a predicted motion vector of the to-be-processed block.

2. The method according to claim 1, further comprising:
using the predicted motion vector of the reference block as the initial motion vector of the reference block to obtain the initial motion vector; or
adding the predicted motion vector of the reference block and a motion vector difference of the reference block to obtain the initial motion vector.

3. The method according to claim 1, further comprising:
using the predicted motion vector of the to-be-processed block as an initial motion vector of the to-be-processed block.

4. The method according to claim 1, further comprising:
adding the predicted motion vector of the to-be-processed block and a motion vector difference of the to-be-processed block to obtain an initial motion vector of the to-be-processed block.

5. The method according to claim 4, wherein the motion vector difference of the to-be-processed block is obtained by parsing first identification information in a bitstream.

6. An apparatus, comprising:
a processor coupled to a memory that stores instructions, which when executed by the processor, cause the processor to:
determine a reference block of a to-be-processed block, wherein the reference block and the to-be-processed block have a preset spatial correlation, the reference block is obtained based on a prediction block of the reference block determined by a refined initial motion vector, the refined initial motion vector is obtained based on an initial motion vector and one or more preset motion vector offsets, and the initial motion vector is obtained based on a predicted motion vector of the reference block; and
use the initial motion vector as a predicted motion vector of the to-be-processed block.

7. The apparatus according to claim 6, wherein the instructions, when executed by the processor, further cause the processor to:
use the predicted motion vector of the to-be-processed block as an initial motion vector of the to-be-processed block.

8. The apparatus according to claim 6, wherein the instructions, when executed by the processor, further cause the processor to:
add the predicted motion vector of the to-be-processed block and a motion vector difference of the to-be-processed block to obtain an initial motion vector of the to-be-processed block.

9. The apparatus according to claim 8, wherein first identification information in a bitstream is parsed to obtain the motion vector difference of the to-be-processed block.

10. The apparatus according to claim 9, wherein the processor to determine the reference block of the to-be-processed block comprises the instructions, when executed by the processor, cause the processor to:
parse a bitstream to obtain identification information; and
determine the reference block of the to-be-processed block based on the identification information.

11. A method of decoding a picture, comprising:
determining a reference block of a to-be-processed block of the picture, wherein the reference block and the to-be-processed block have a preset spatial correlation, the reference block is obtained based on a prediction block of the reference block determined by a refined initial motion vector, the refined initial motion vector is obtained based on an initial motion vector of the to-be-processed block and one or more preset motion vector offsets, and the initial motion vector is obtained based on a predicted motion vector of the reference block;
using the initial motion vector as a predicted motion vector of the to-be-processed block;
obtaining a final motion vector of the to-be-processed block based on the predicted motion vector of the to-be-processed block; and
decoding the to-be-processed block based on the final motion vector.

12. The method according to claim 11, further comprising:
using the predicted motion vector of the reference block as the initial motion vector of the reference block to obtain the initial motion vector; or
adding the predicted motion vector of the reference block and a motion vector difference of the reference block to obtain the initial motion vector.

13. The method according to claim 11, further comprising:
using the predicted motion vector of the to-be-processed block as an initial motion vector of the to-be-processed block,
wherein obtaining the final motion vector of the to-be-processed block comprises refining the initial motion vector of the to-be-processed block to obtain the refined initial motion vector.

14. The method according to claim 11, further comprising:
adding the predicted motion vector of the to-be-processed block and a motion vector difference of the to-be-processed block to obtain an initial motion vector of the to-be-processed block,
wherein obtaining the final motion vector of the to-be-processed block comprises refining the initial motion vector of the to-be-processed block to obtain the refined initial motion vector.

* * * * *